US009448686B2

(12) United States Patent
Jung et al.

(10) Patent No.: US 9,448,686 B2
(45) Date of Patent: Sep. 20, 2016

(54) MOBILE TERMINAL AND METHOD FOR CONTROLLING CHAT CONTENT BASED ON DIFFERENT TOUCH ACTIONS FOR A SPECIFIC KEY

(71) Applicant: LG ELECTRONICS INC., Seoul (KR)

(72) Inventors: Juhyun Jung, Seoul (KR); Jumin Chi, Seoul (KR); Boram Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 13/755,610

(22) Filed: Jan. 31, 2013

(65) Prior Publication Data

US 2014/0019885 A1    Jan. 16, 2014

(30) Foreign Application Priority Data

Jul. 13, 2012    (KR) ........................ 10-2012-0076440

(51) Int. Cl.
   *G06F 3/048*    (2013.01)
   *G06F 3/0481*    (2013.01)
   *H04M 1/725*    (2006.01)

(52) U.S. Cl.
   CPC .......... *G06F 3/0481* (2013.01); *H04M 1/7258* (2013.01); *H04M 1/72547* (2013.01)

(58) Field of Classification Search
   CPC ... H04L 12/581; G06Q 10/10; G06Q 10/107
   USPC ................................................. 715/758, 863
   See application file for complete search history.

(56) References Cited

U.S. PATENT DOCUMENTS

| 5,258,748 | A | 11/1993 | Jones |
| 6,795,011 | B1 | 9/2004 | Berthoud et al. |
| 9,304,602 | B2 * | 4/2016 | Ghassabian ........... G06F 3/0236 |
| 2002/0180622 | A1 | 12/2002 | Lui et al. |
| 2003/0151589 | A1 * | 8/2003 | Bensen et al. ................. 345/156 |
| 2003/0234814 | A1 * | 12/2003 | Salminen et al. ............. 345/758 |
| 2008/0316183 | A1 * | 12/2008 | Westerman ........... G06F 3/0416 345/173 |
| 2009/0289913 | A1 * | 11/2009 | Chang et al. .................. 345/173 |
| 2009/0306980 | A1 * | 12/2009 | Shin .............................. 704/235 |
| 2012/0075173 | A1 * | 3/2012 | Ashbrook et al. ............. 345/156 |
| 2012/0188168 | A1 * | 7/2012 | Yoon .............................. 345/168 |

FOREIGN PATENT DOCUMENTS

EP    1 764 987 A1    3/2007

* cited by examiner

*Primary Examiner* — Kieu Vu
*Assistant Examiner* — Joy M Weber
(74) *Attorney, Agent, or Firm* — Birch, Stewart, Kolasch & Birch, LLP

(57) ABSTRACT

A mobile terminal including a touchscreen configured to display a keypad including keys for inputting and sending a chat content to at least one chat counterpart; a wireless communication unit configured to wirelessly communicate the chat content with the at least one chat counterpart; and a controller configured to receive a touch action on a specific key of the keypad, determine if the touch action corresponds to a preset touch manner that is different than a single short touch action on the specific key, send or input the chat content if the touch action is the single short touch action on the specific key, and provide an editing function of the chat content rather than sending or inputting the chat content if the touch action corresponds to the preset touch manner that is different than the single short touch action.

7 Claims, 32 Drawing Sheets

FIG. 33
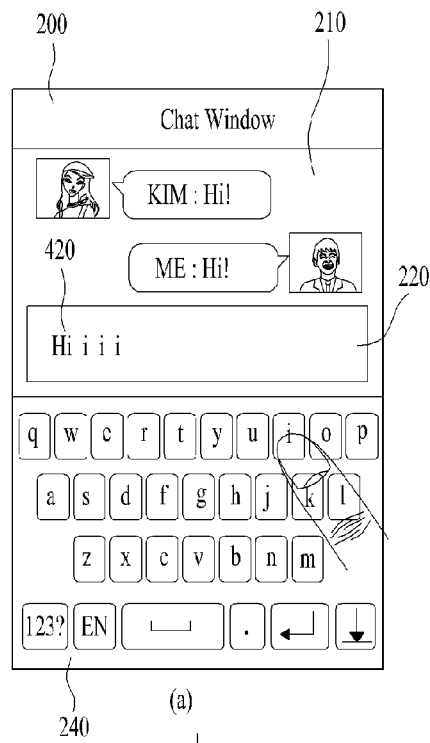
(a)
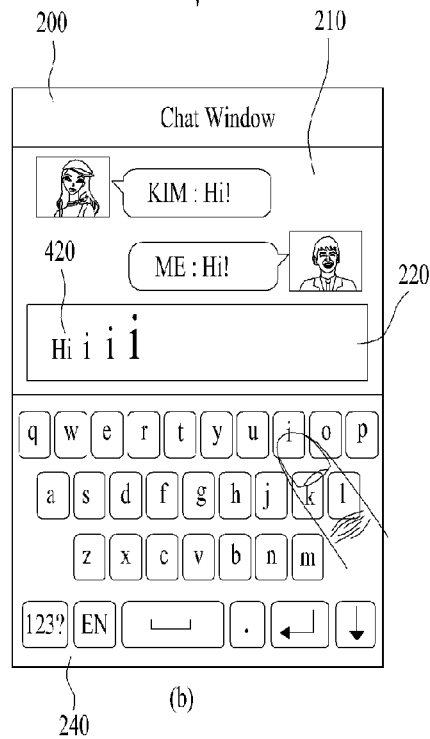
(b)

MOBILE TERMINAL AND METHOD FOR CONTROLLING CHAT CONTENT BASED ON DIFFERENT TOUCH ACTIONS FOR A SPECIFIC KEY

Pursuant to 35 U.S.C. §119(a), this application claims the benefit of earlier filing date and right of priority to Korean Application No. 10-2012-0076440, filed on Jul. 13, 2012, the contents of which is hereby incorporated by reference herein in their entirety.

BACKGROUND OF THE INVENTION

1. Field of the Invention

The present invention relates to a mobile terminal, and more particularly, to a mobile terminal and a method of controlling the mobile terminal.

2. Discussion of the Related Art

A mobile terminal can perform various functions, such as data and voice communications, capturing still images and video via a camera, recording audio, playing music files and outputting music via a speaker system, and displaying images and video on a display. Some terminals include additional functionality to support game playing, while other terminals are also configured as multimedia players. More recently, mobile terminals have been configured to receive broadcast and multicast signals to permit viewing of content, such as videos and television programs.

Generally, terminals can be classified into mobile terminals and stationary terminals. In addition, the mobile terminals can be further classified into handheld terminals and vehicle mount terminals. Users of mobile terminals can also perform chat sessions with other users.

For example, a user of a mobile terminal opens a chat room and can chat with at least one counterpart in the chat room through various chat messenger or message functions. In more detail, the terminal displays a chat window including a keypad including keys for inputting chat contents and transmitting the input chat contents, an input window for displaying the chat contents input via the keypad, and a chat content display window for displaying the chat contents transceived with the chat counterpart.

In addition, the user can send the chat content containing text, words, phrases and the like to the chat counterpart via character keys (e.g., Foreign language letter keys, English letter keys, numeral keys, symbol keys, etc.) and various function keys (e.g., a space bar, an enter key, etc.) within the keypad and then touching a send key within the keypad. However, only unique functions are pre-assigned to the keys for inputting and transmitting the chat contents.

SUMMARY OF THE INVENTION

Accordingly, one aspect of the present invention is to provide a mobile terminal and controlling method thereof that substantially obviate one or more problems due to limitations and disadvantages of the related art.

Another object of the present invention is to provide a mobile terminal and controlling method thereof, by which a user is provided with a function of editing chat contents in addition to unique functions pre-assigned (or assigned) to keys for inputting and transmitting the chat contents.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, the present inventions provides a mobile terminal a touchscreen configured to display a keypad including keys for inputting and sending a chat content to at least one chat counterpart and an input window for displaying the chat content input via the keys; a wireless communication unit configured to wirelessly communicate the chat content with the at least one chat counterpart; and a controller configured to receive a touch action on a specific key of the keypad, determine if the touch action corresponds to a preset touch manner that is different than a single short touch action on the specific key, send or input the chat content if the touch action is the single short touch action on the specific key, and provide an editing function of the chat content rather than sending or inputting the chat content if the touch action corresponds to the preset touch manner that is different than the single short touch action.

In another aspect, the present invention provides a method of controlling a mobile terminal, and which includes displaying, via a touchscreen of the mobile terminal, a keypad including keys for inputting and sending a chat content to at least one counterpart and an input window for displaying the chat content input via the keys; wirelessly communicating, via a wireless communication unit of the mobile terminal, the chat content with the at least one chat counterpart; receiving, via a controller of the mobile terminal, a touch action on a specific key of the keypad; determining, via the controller, if the touch action corresponds to a preset touch manner that is different than a single short touch action on the specific key; sending or inputting, via the controller, the chat content if the touch action is the single short touch action on the specific key; and providing, via the controller, an editing function of the chat content rather than sending or inputting the chat content if the touch action corresponds to the preset touch manner that is different than the single short touch action.

Effects obtainable from the present invention are non-limited by the above mentioned effect. In addition, other unmentioned effects can be clearly understood from the following description by those having ordinary skill in the technical field to which the present invention pertains. It is to be understood that both the foregoing general description and the following detailed description of the present invention are and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIGS. 5 to 33 are diagrams illustrating a method for providing a chat content editing function using a specific key of a keypad according to an embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipment, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 2B. However, the present invention can also be applied to other types of terminals.

Figure 1:
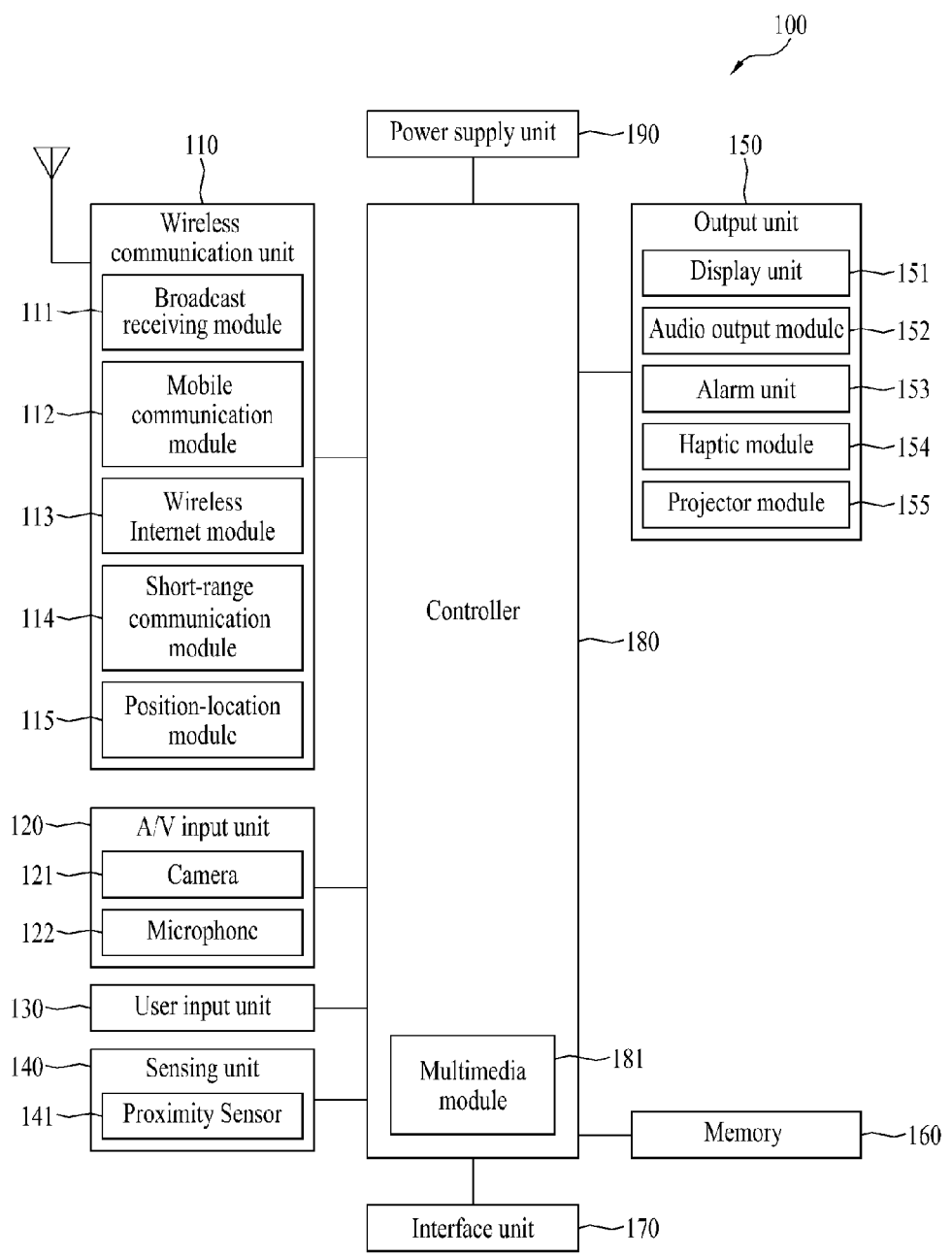
FIG. 1 illustrates a block diagram of a mobile terminal in accordance with one embodiment of the present invention.

FIG. 1 illustrates a block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-location module 115.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information is provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast-convergence of broadcast and mobile services (DVB-CBMS), Open Mobile Alliance broadcast (OMA-BCAST), the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro™), World Interoperability for Microwave Access (WiMAX™), or High Speed Downlink Packet Access (HSDPA).

Moreover, as mentioned in the foregoing description, the wireless internet module 113 can receive or download the data relevant to the area, in which the mobile terminal 100 is located, from the external server.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth™ or ZigBee™.

The position-location module 115 identifies or otherwise obtains the location of the mobile terminal 100. In one embodiment, the position-location module 115 can include a global positioning system (GPS) module.

The A/V input unit 120 can be used to input an audio signal or a video signal, and can include a camera 121 and a microphone 122. For example, the camera 121 can have a digital zoom feature and can process image frames of still images or video obtained by an image sensor of the camera 121 in a video call mode or a photographing mode. The processed image frames can be displayed on a display unit 151.

The image frames processed by the camera 121 can be stored in the memory 160 or can be externally transmitted via the wireless communication unit 110. Optionally, at least two cameras 121 is provided to the mobile terminal 100 according to environment of usage.

The microphone 122 can receive an external audio signal while operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal 100. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmitive type, such that the display unit 151 is implemented as a transparent display. For example, the transparent display can include a transparent OLED (TOLED) display. The rear structure of the display unit 151 can also be of a light transmitive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller. The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor, and therefore, can have wide applications in the mobile terminal 100.

The proximity sensor 141 can include a transmittive photo-electric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source, such as a laser, that generates adequate light for external projection of an image, means for producing the image to be projected via the light generated from the light source, and a lens for enlarging the projected image according to a predetermined focus distance. The projector module 155 can further include a device for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen. A multimedia module 181 may also be provided.

The power supply unit 190 can be an external power source, an internal power source, or a combination thereof. The power supply unit 190 can supply power to other components in the mobile terminal 100.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2:
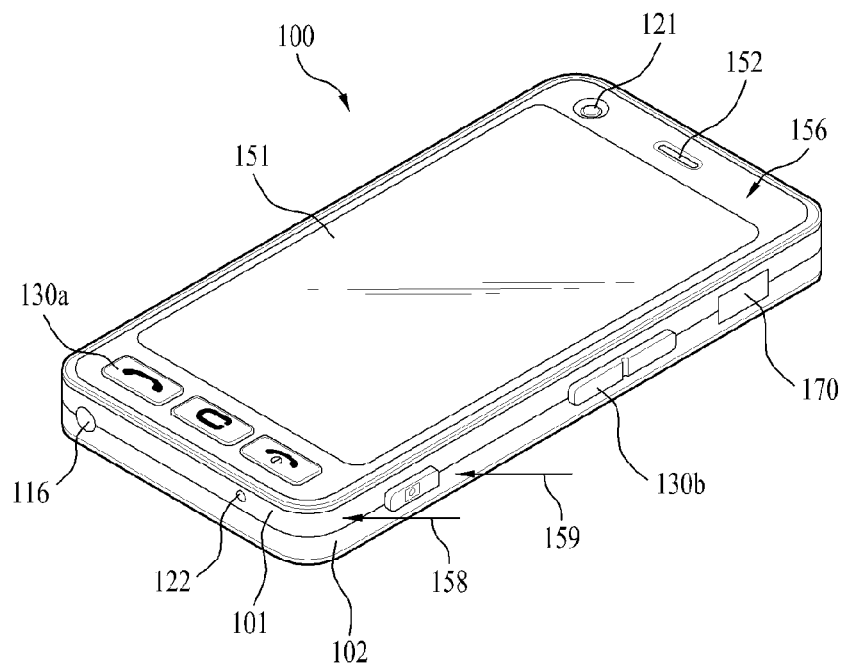
FIG. 2 is a front perspective view of the mobile terminal in accordance with one embodiment of the present invention.

FIG. 2 is a front perspective view of the mobile terminal 100 in accordance with one embodiment of the present invention. In FIG. 2, the mobile terminal 100 is shown to have a bar type terminal body.

However, the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2, for example, the display unit 151 can be configured to occupy a substantial portion of the front face 156 of the front case 101. As also shown in FIG. 2, the audio output unit 152 and the camera 121 can be arranged in proximity to one end of the display unit 151, and the user input module 130a and the microphone 122 can be located in proximity to another end of the display unit 151. As further shown in FIG. 2, the user input module 130b and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130a and 130b shown in FIG. 2. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input such commands as "start," "end," and "scroll" to the mobile terminal 100. The user input module 130b can allow a user to input a command for adjusting the volume of the audio output unit 152 or a command for switching to a touch recognition mode of the display unit 151.

Figure 3:
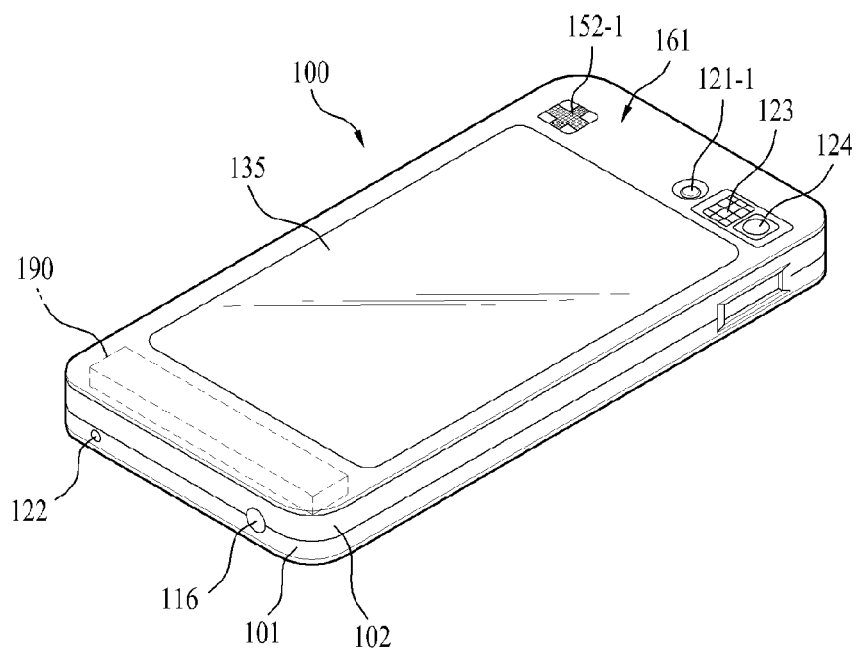
FIG. 3 is a rear perspective view of the mobile terminal in accordance with one embodiment of the present invention.

FIG. 3 is a rear perspective view of the mobile terminal 100 in accordance with one embodiment of the present invention. As shown in FIG. 2, a camera 121-1 can be additionally located on a rear surface 161 of the rear case 102. The camera 121-1 has a direction of view that is substantially opposite to the direction of view of the camera 121 shown in FIG. 2. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2 and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 3 also shows the power supply unit 190 for providing power to the mobile terminal 100. For example, the power supply unit 190 can be situated either inside the mobile terminal 100 or detachably coupled to the mobile terminal 100.

As shown in FIG. 3, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2 can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

In the following description, if a specific key for inputting or transmitting a chat content among a plurality of keys of a keypad displayed within a chat window is touched in a preset manner during an ongoing chat, a method of providing an editing function of editing the chat content to a user in addition to a unique function assigned to the specific key according to an embodiment of the present invention is explained in detail with reference to FIGS. 4 to 33.

Figure 4:
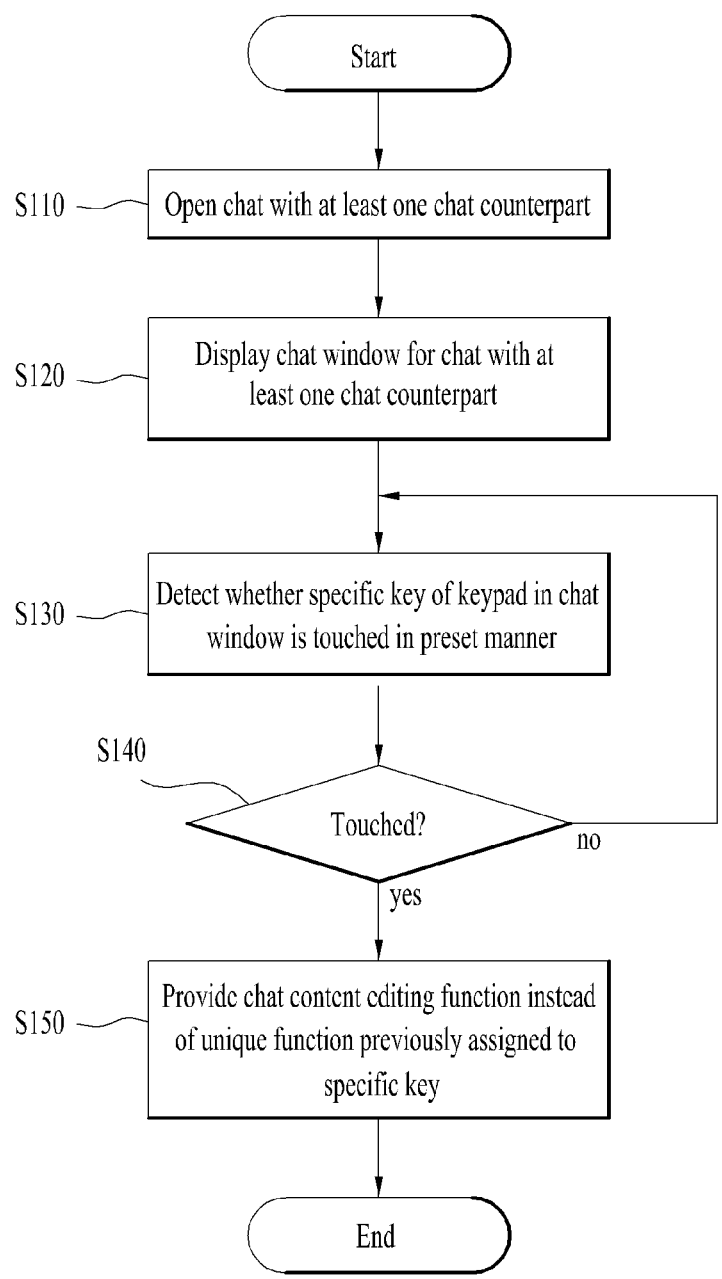
FIG. 4 is a flowchart illustrating a method for providing a chat content editing function using a specific key of a keypad according to an embodiment of the present invention.

In more detail, FIG. 4 is a flowchart illustrating a method for providing a chat content editing function using a specific key of a keypad according to an embodiment of the present invention. Referring to FIG. 4, if an application for a chat with at least one counterpart is selected via the touchscreen 151 or the user input unit 130, the controller 180 activates the selected application.

In this instance, the application may include an application provided by a manufacturer of the mobile terminal 100 on the release of the mobile terminal 100. Alternatively, the application may include an application installed on the mobile terminal 100 by being downloaded from an external web server (generally called an 'app store') by a user.

In particular, the controller 180 opens a chat with at least one counterpart belonging to a preset group or selected by a user (S110) and displays a chat window for the chat with the at least one counterpart on the touchscreen 151 (S120). The chat window may include a chat content display window configured to display chat contents transceived with the at least one chat counterpart, a key pad having keys for inputting the chat contents to transmit to the at least one counterpart and a send key configured to transmit the chat contents input via the keys to the at least one chat counterpart, and a chat content input window configured to display the chat contents input via the keypad.

Preferably, if the chat content input window is touched, the mobile terminal 100 displays a virtual keypad on the touchscreen 151 and then displays the chat content input via the displayed virtual keypad on the chat content input window. In this instance, the keypad may include various keys for inputting characters, numerals, special characters, symbols, emoticons, words, texts and the like to implement the chat contents, a space bar configured to shift a cursor, which is displayed on the chat content input window, by 1 box, an enter key configured to shift a row of the cursor to a next row within the chat content input window, and a send key configured to send the chat contents.

If the chat content to be transmitted to the counterpart is input via the keypad or before the chat content is input, the controller 180 detects whether a specific key among the keys provided to the keypad is touched in a preset manner (S130). In this instance, the specific key may include one of a specific character key, the space bar, the enter key and the send key among the keys provided to the keypad.

In addition, the preset touch manner can correspond to a touch action to which a command for activating an editing function of editing a chat content already input to the chat content input window or a chat content to be input to the chat content input window is assigned as well as a unique function previously assigned to the specific key according to an embodiment of the present invention.

For instance, the preset touch manner may include one of a long touch for having the specific key touched for a preset time, a drag touch for shifting or scrolling the long touched specific key in a specific direction, a pinching-in/out multi-touch for changing a distance between two points multi-touched on the specific key, and the like.

In addition, different editing functions for editing the chat content can be assigned to the long touch, the drag touch and the pinching-in/out multi-touch, respectively. In particular, the mobile terminal 100 provides a user with a touch gesture setting menu for editing function settings. Subsequently, the user sets up a desired editing function to a desired touch gesture through the touch gesture setting menu and then inputs the touch gesture set up by himself to the specific key, thereby editing the chat content using the editing function assigned to the input touch gesture.

If the controller 180 detects that the specific key is touched in the preset manner (Yes in S140), the controller 180 provides the editing function corresponding to the preset manner for the chat content instead of the unique function previously assigned to the specific key (S150). In this instance, the editing function may include one of a popular phrase (e.g., words or phrase used frequently) insert function, a font style editing function of editing a font style (e.g., a font type, a font size, a font color, etc.) of the chat content, a word balloon style editing function of editing a word balloon for displaying the chat content thereon, an emoticon insert function and the like. If the controller 180 detects that the specific key is not touched in the preset manner (No in S140), the controller 180 returns to step S130.

If the specific key is touched in the preset manner, the controller 180 activates the editing function while maintaining the touch to the specific key and then provides the activated editing function to the user. If the touch is released from the specific key, the controller 180 transmits the chat content edited while maintaining the touch to the specific key to the counterpart via the wireless communication unit 110.

If the specific key is touched in the preset manner, the controller 180 can provide the editing function for a preset duration. If the preset duration expires, the controller 180 can transmit the chat content edited for the preset duration to the chat counterpart. For example, the controller 180 displays information (e.g., 5 seconds→4 seconds→3 seconds→2 seconds→1 second→transmit) indicating a countdown of the preset duration, thereby informing the user of the time during which the editing function is provided.

After the specific key has been touched in the preset manner, while the editing function is being provided, the controller 180 checks whether the editing function is used by the user. If the editing function is not used by the user for the preset duration, the controller 180 stops providing the editing function or may transmit the chat content edited so far to the chat counterpart.

In the following description, a process for editing a chat content in accordance with a type of the specific key is explained in detail with reference to FIGS. 5 to 33. First of all, when the specific key is a send key for chat content transmission, if the chat content send key is touched in a preset manner, before the chat content is transmitted to a chat counterpart, a process for an editing function of editing the chat content is described in detail with reference to FIGS. 5 to 21 as follows.

Figure 5:
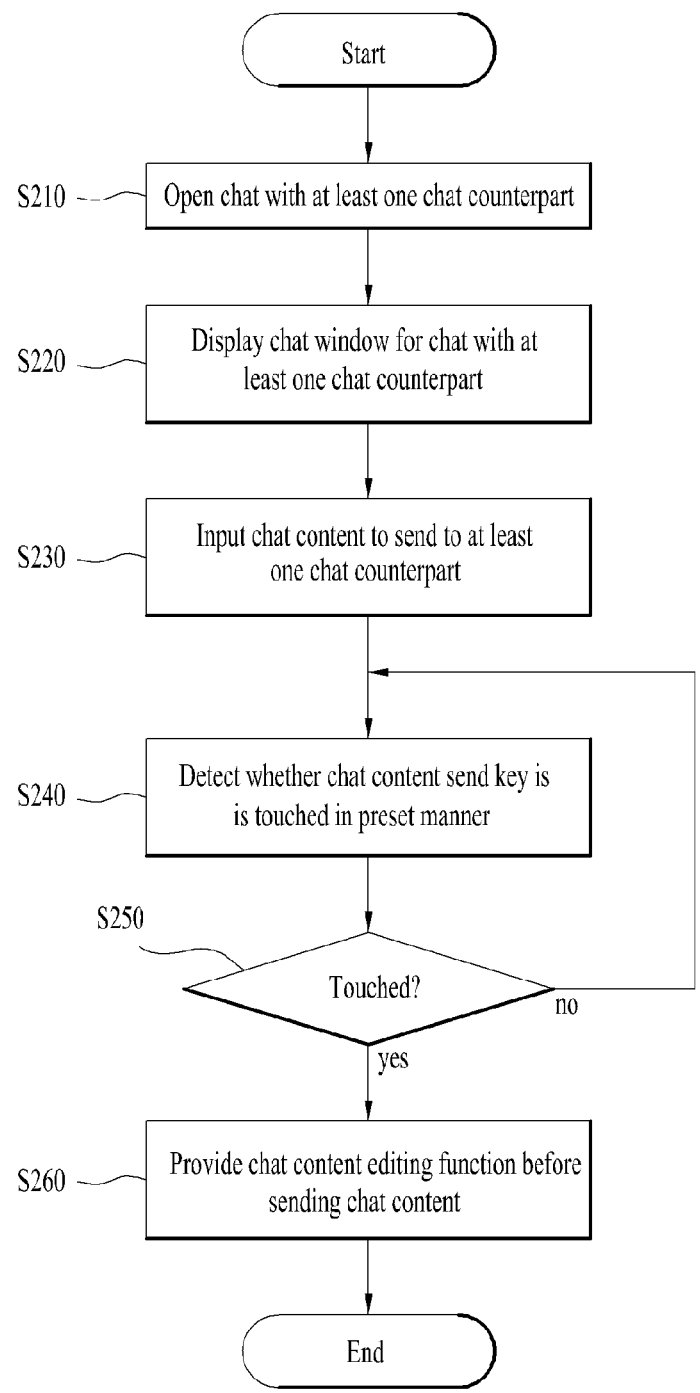

FIG. 5 is a flowchart illustrating a method for providing an editing function of editing a chat content using a chat content send key according to an embodiment of the present invention, and FIGS. 6 to 21 are diagrams of display screen configurations to implement a process for providing a chat content editing function using a specific key of a keypad according to an embodiment of the present invention.

Referring to FIG. 5, the controller 180 opens a chat with at least one counterpart belonging to a preset group or at least one counterpart selected by a user (S210), and then displays a chat window for the chat with the at least one counterpart on the touchscreen 151 (S220). If a chat content, which is to be transmitted to the chat counterpart, is input via the chat content input window (S230), the controller 180 detects whether the chat content send key is touched in a preset manner (S240).

If the chat content send key is detected as touched in the preset manner (Yes in S250), the controller 180 provides an editing function matching the preset touch manner for the chat content before the chat content is transmitted (S260). In this instance, the editing function may include one of a popular phrase (e.g., words or phrase used frequently) insert function, a font style editing function of editing a font style (e.g., a font type, a font size, a font color, etc.) of the chat content, a word balloon style editing function of editing a word balloon for displaying the chat content thereon, an emoticon insert function and the like. If the chat content send key is not detected as touched in the preset manner (No in S250), the controller 180 returns to step S240.

If the send key is touched in the preset manner, the controller 180 activates the editing function while the touch to the send key is maintained and then provides the activated editing function to the user. If the touch is released from the send key, the controller 180 transmits the edited chat content to the counterpart via the wireless communication unit 110.

As discussed above, if the send key is touched in the preset manner, the controller 180 provides the editing function for a preset duration. If the preset duration expires, the controller 180 can transmit the chat content edited for the preset duration to the chat counterpart. For example, the controller 180 displays information (e.g., 5 seconds→4 seconds→3 seconds→2 seconds→1 second→transmit) indicating a countdown of the preset duration, thereby informing the user of the time during which the editing function is provided.

After the send key has been touched in the preset manner, while the editing function is being provided, the controller 180 checks whether the editing function is used by the user. If the editing function is not used by the user for the preset duration, the controller 180 stops providing the editing function or may transmit the chat content edited so far to the chat counterpart.

In the following description, the steps S240, S250 and S260 are explained in detail with reference to FIGS. 6 to 21. In particular, FIGS. 6 to 21 show that an editing function, which is provided when a chat content send key is touched in a preset manner, is a popular phrase insert function.

Referring to FIG. 6(a), a display window 210 for displaying chat contents with a $1^{st}$ counterpart KIM and a $2^{nd}$ counterpart LEE, an input window 220 for inputting chat contents to transmit to the $1^{st}$ counterpart KIM and the $2^{nd}$ counterpart LEE and a send key 230 for transmitting the chat contents input via the input window 220 are included in a chat window 200.

Figure 6:
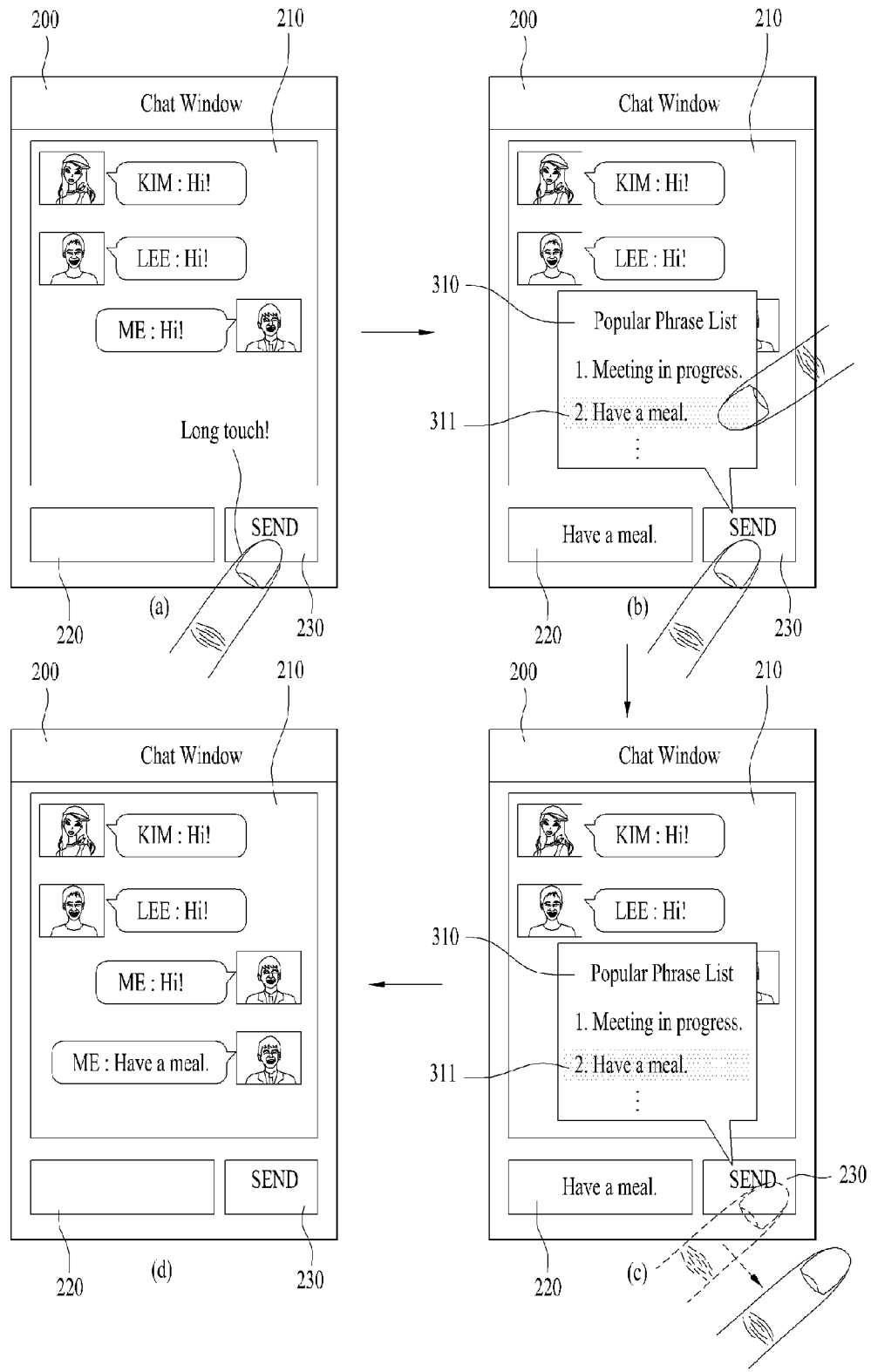
Figure 7:
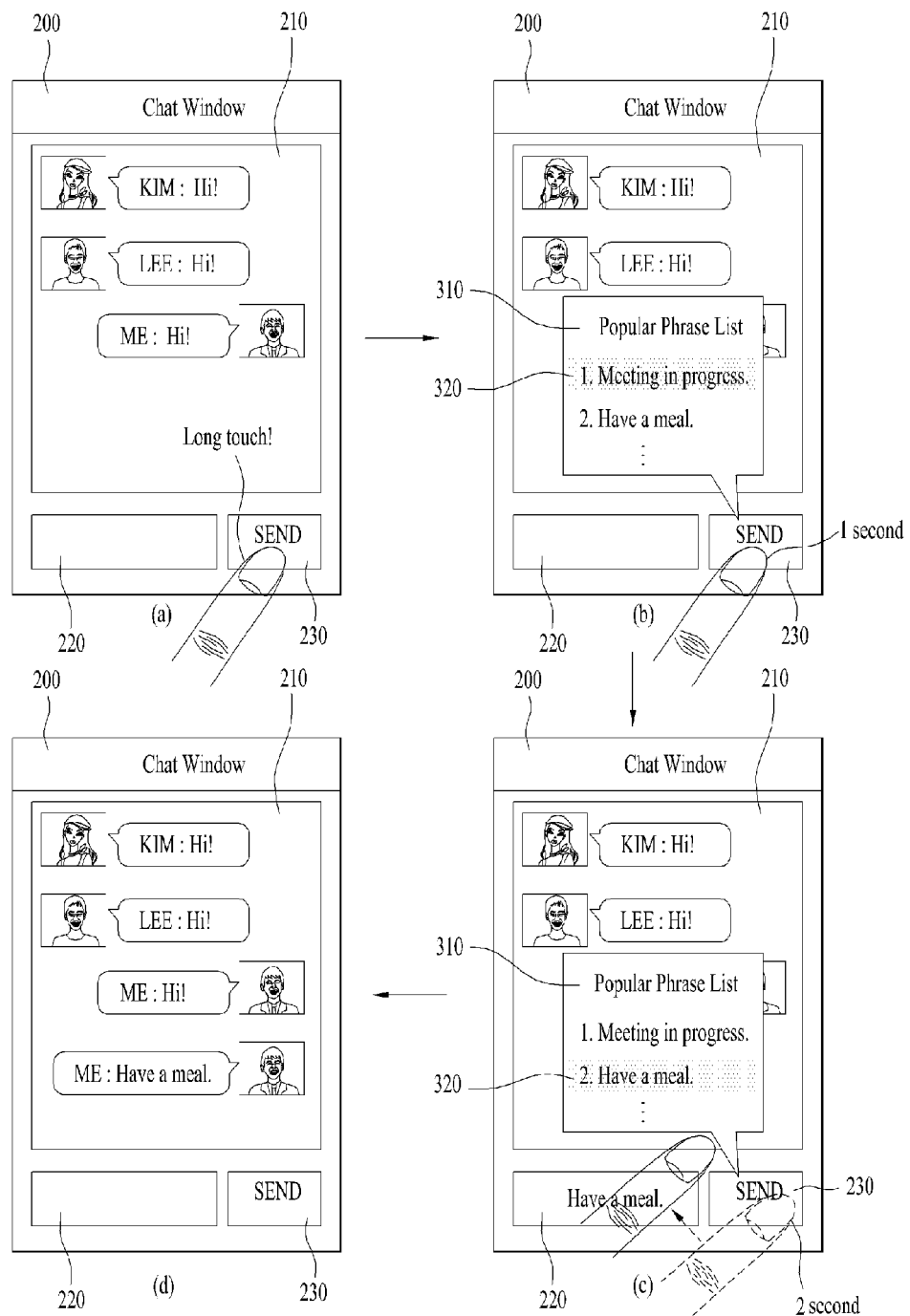
Figure 8:
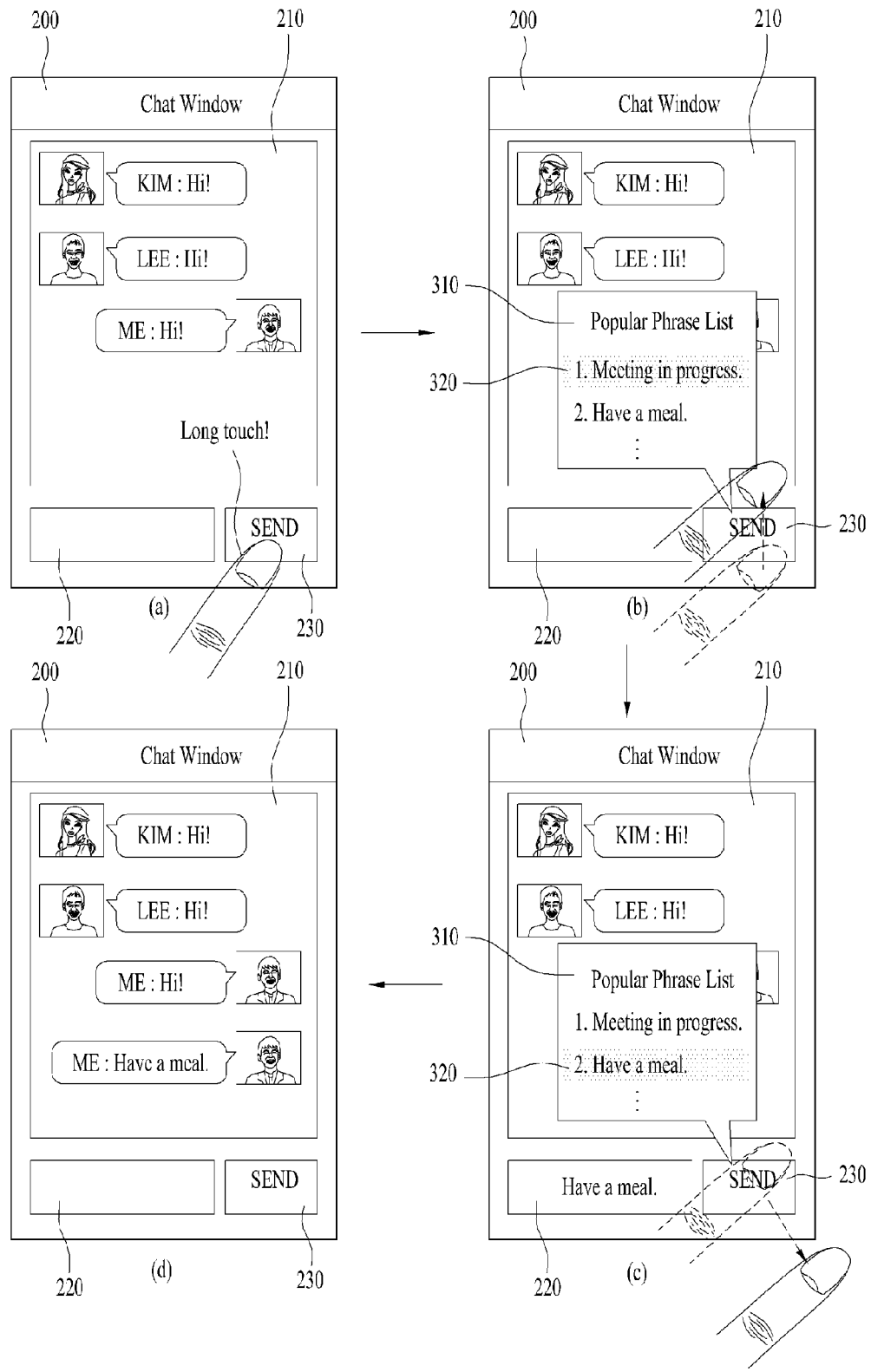

If the send key 230 is touched in a preset manner, referring to FIG. 6(b), the controller 180 displays a popular phrase list 310 containing at least one popular phrased as an editing function assigned to the preset touch manner. In FIG. 6, the preset touch manner is a long touch manner. In particular, if the send key 230 is short touched once in a previous manner, the controller 180 transmits the chat content input to the input window 220 to the chat counterpart. However, if the send key 230 is long touched as in the present invention, the controller 180 displays the popular phrase list 310.

If a specific popular phrase is touched in the popular phrase list 310, the controller 180 inserts the touched specific popular phrase into the input window 220. If the send key 230 is touched again or the touch is released, for example, the controller 180 transmits the chat content containing the popular phrase 311 inserted into the input window 220 to the chat counterpart.

Moreover, referring to FIG. 6(b), while the long touch to the send key 230 is maintained, the controller 180 displays the popular phrase list 310. If a specific popular phrase 311 is touched in the popular phrase list 310, the controller 180 inserts the touched specific popular phrase 311 into the input window 220 as shown in FIG. 6(c).

If the long touch is released from the send key 230 (FIG. 6(c)), the controller 180 sends the chat content containing the popular phrase 311 inserted into the input window 220 to the counterpart and stops displaying the popular phrase list 310 (FIG. 6(d)). In particular, the popular phrase list 310 is provided to the user while the long touch to the send key 230 is maintained.

Referring to FIG. 7(a) and FIG. 7(b), if the send key 230 is long touched, the controller 180 displays a popular phrase list 310 containing at least one popular phrase as an editing function assigned to the long touch manner. While the long touch to the send key 230 is maintained, referring to FIG. 7(b) and FIG. 7(c), the controller 180 shifts a highlight cursor 320 within the popular phrase list 310 in response to a time taken to maintain the long touch to the send key 230.

For instance, referring to FIG. 7(b), after the popular phrase list 310 has been displayed, if 1 second of the time taken to maintain the long touch to the send key 230 elapses, the highlight cursor 320 is situated at a $1^{st}$ popular phrase 'Meeting in progress'. In another instance, referring to FIG. 7(c), if 2 seconds of the time taken to maintain the long touch to the send key 230 elapses, the highlight cursor 320 is shifted to a $2^{nd}$ popular phrase 'Have a meal' from the $1^{st}$ popular phrase 'Meeting in progress'.

Thereafter, while the highlight cursor 320 is situated at the $2^{nd}$ popular phrase 'Have a meal' within the popular phrase list 310, if the long touch is released from the send key 230, the controller 180 inserts the $2^{nd}$ popular phrase 'Have a meal' having the highlight cursor 320 situated thereat into the input window 220 (FIG. 7(c)), and then sends the chat content containing the 2$^{nd}$ popular phrase 'Have a meal' to the chat counterpart (FIG. 7(d)).

Referring to FIG. 8(a) and FIG. 8(b), if the send key 230 is long touched, the controller 180 displays the popular phrase list 310 containing at least one popular phrase as an editing function assigned to the long touch manner. For example, referring to FIG. 8(b) and FIG. 8(c), if the send key 230 is long touched and then dragged in specific direction, the controller 180 shifts the highlight cursor 320 within the popular phrase list 310 in response to a drag distance between the long touched point and the dragged point.

For instance, referring to FIG. 8(c), if the send key 230 is long touched and then dragged in a top direction (or a left direction), the controller 180 can shift the highlight cursor 320 situated at the 1$^{st}$ popular phrase 'Meeting in progress' to the 2$^{nd}$ popular phrase 'Have a meal'. In another instance, if the send key 230 dragged in the top direction is then dragged in the bottom direction (or right direction), the controller 180 can shift the highlight cursor 320 situated at the 2$^{nd}$ popular phrase 'Have a meal' to the 1$^{st}$ popular phrase 'Meeting in progress'.

The controller 180 can also shift the highlight cursor 320 in proportion to the drag distance from the long touched point to the dragged point. In particular, the controller 180 can shift the highlight cursor 320, which was previously shifted by 1 line, by 2 lines or more in proportion to the drag distance from the long touched point to the dragged point.

While the highlight cursor 320 is situated at the 2$^{nd}$ popular phrase 'Have a meal' within the popular phrase list 310, if the long touch is released from the send key 230, the controller inserts the 2$^{nd}$ popular phrase 'Have a meal' having the highlight cursor 320 situated thereat into the input window 220 (FIG. 8(c)) and then sends the chat content containing the 2$^{nd}$ popular phrase 'Have a meal' to the counterpart (FIG. 8(d)).

Figure 9:
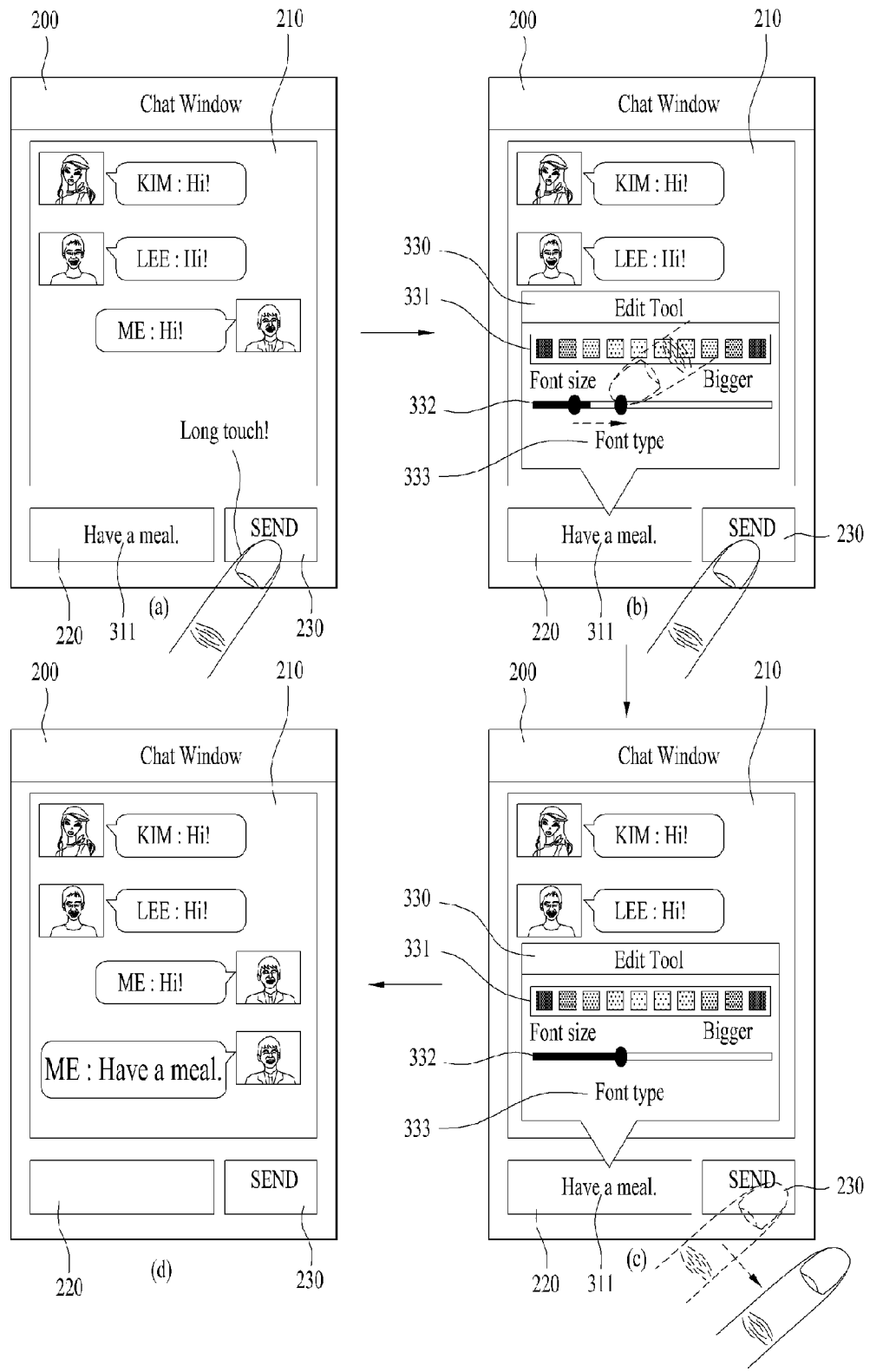
Figure 10:
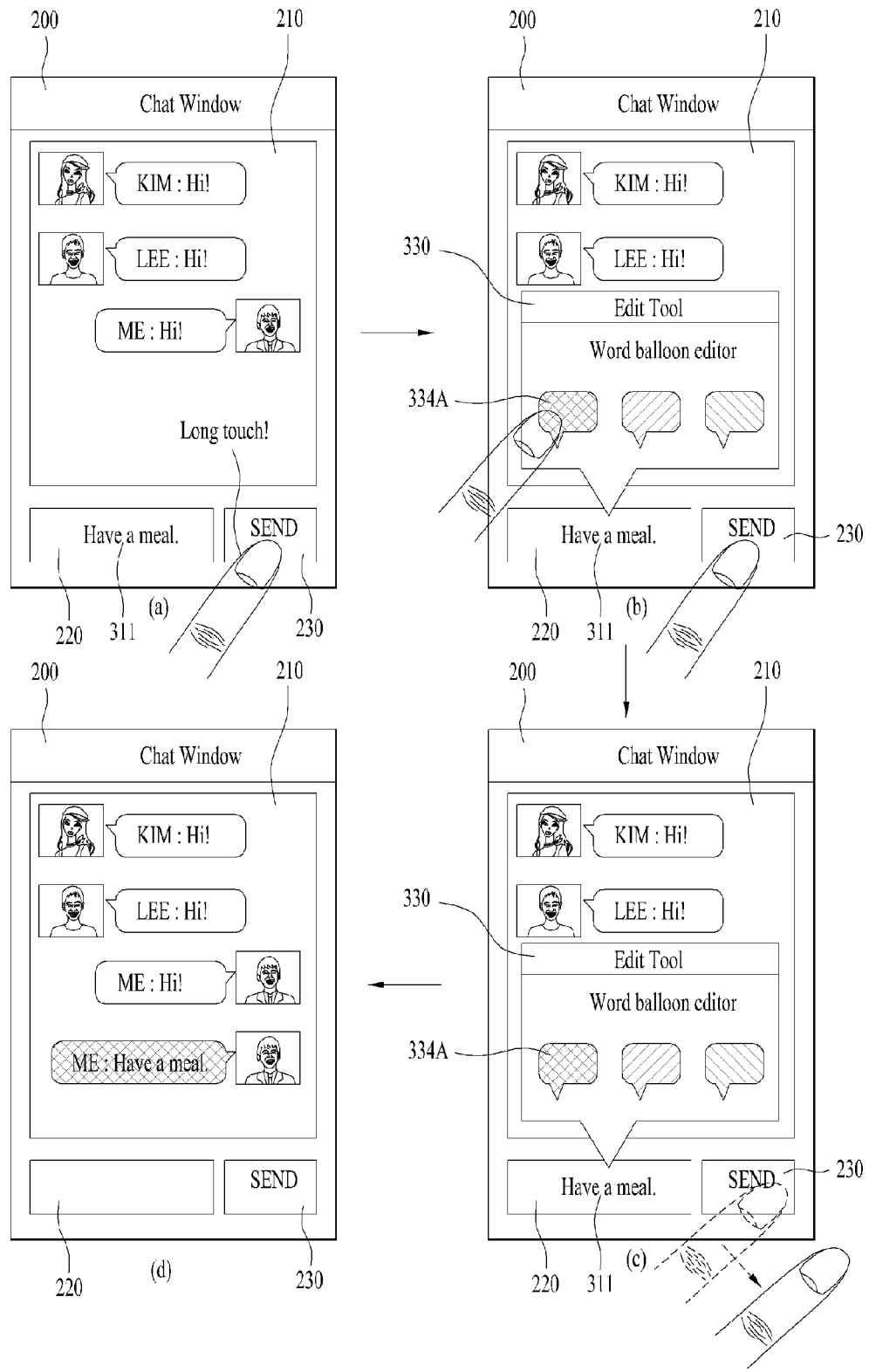
Figure 11:
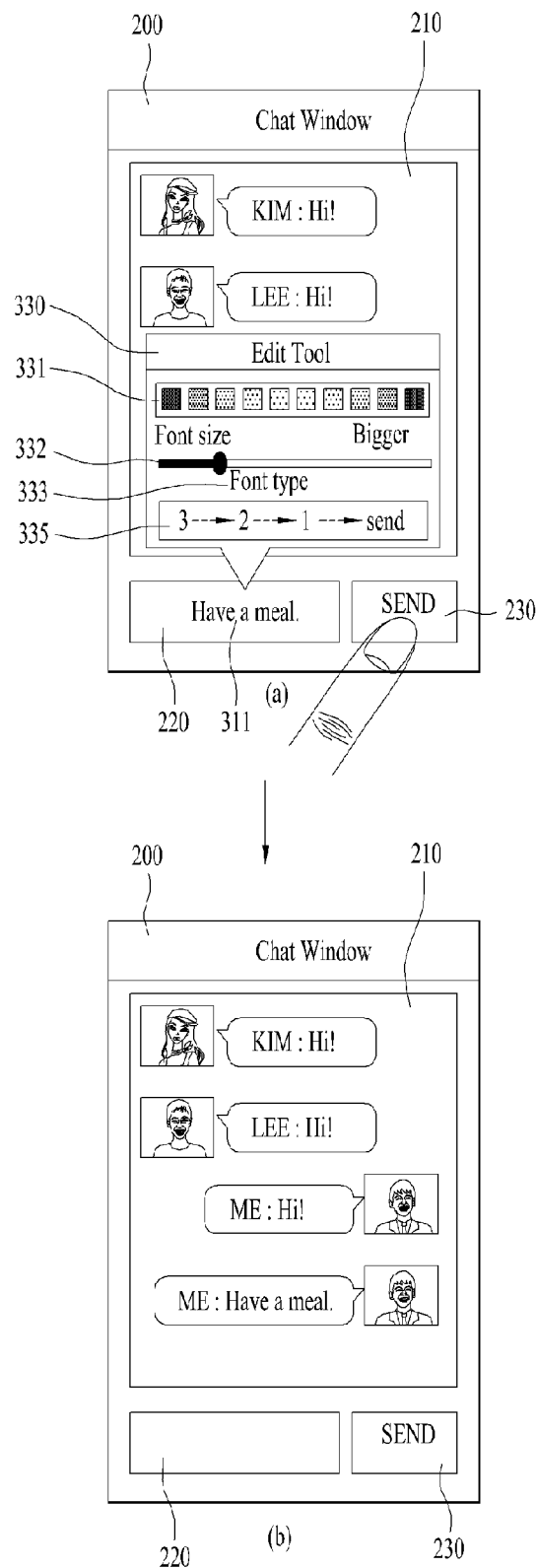
Figure 12:
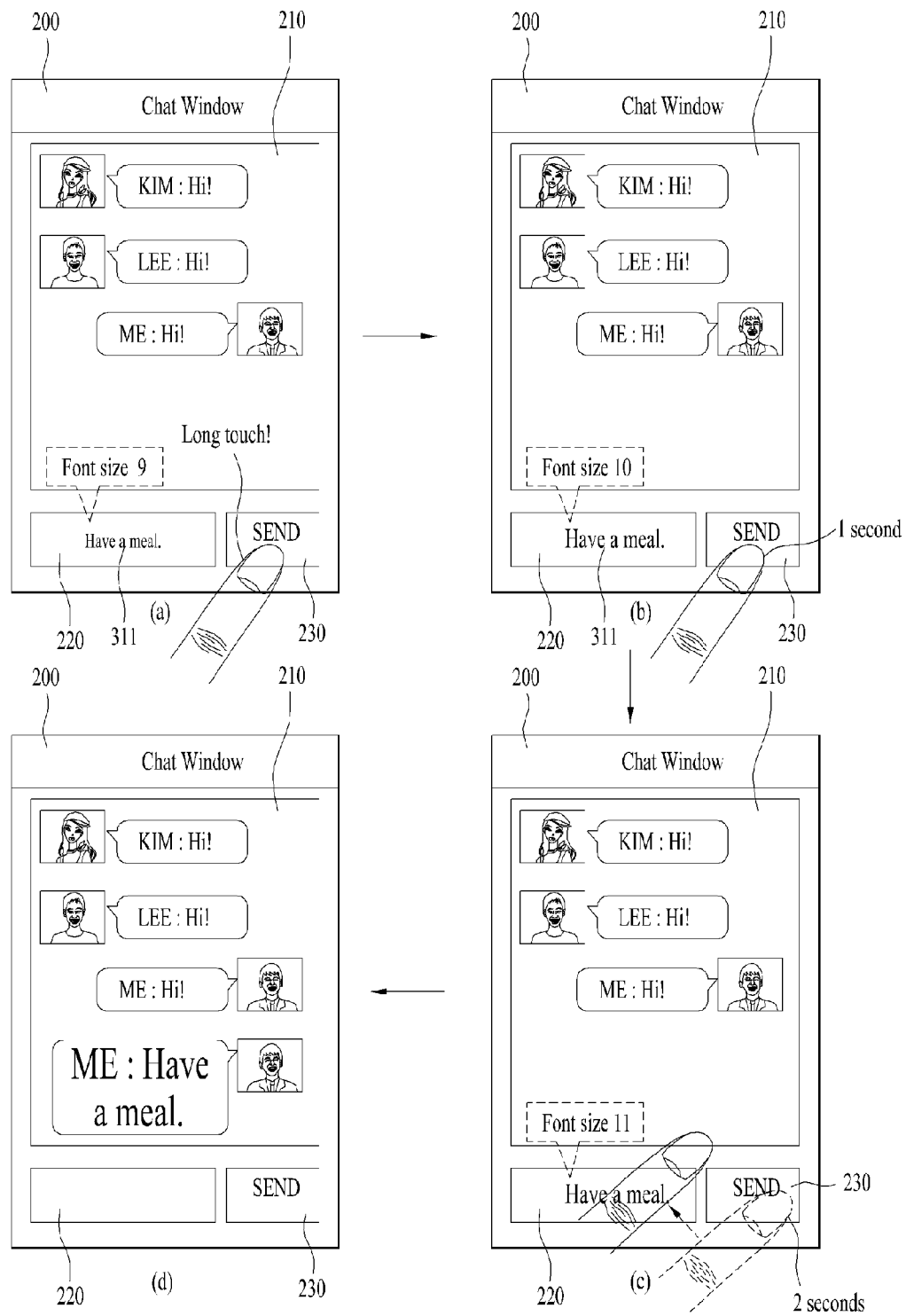
Figure 13:
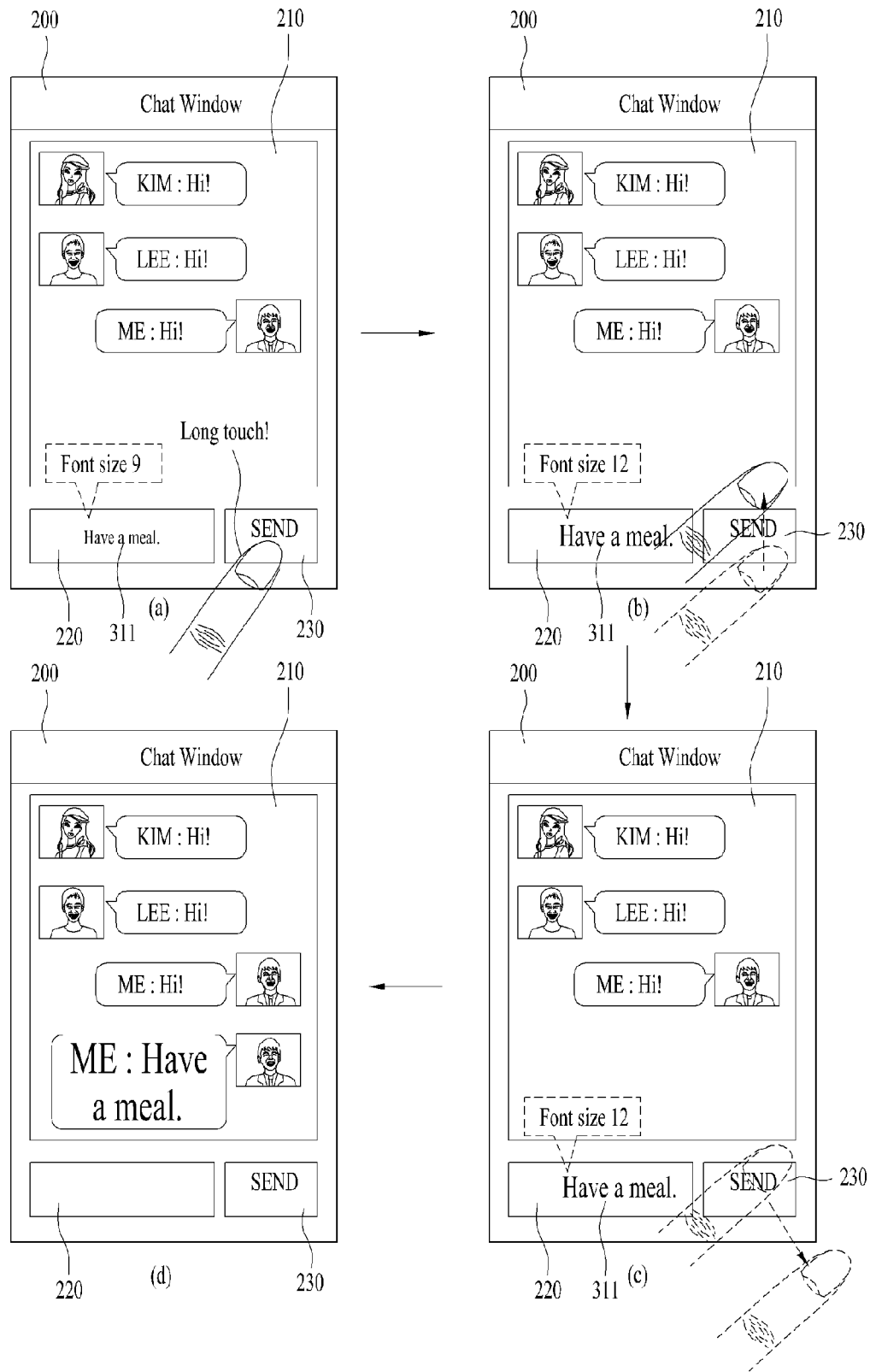

Next, FIGS. 9 to 15 show that an editing function, which is provided if a chat content send key is touched in a preset manner, is a font style editing function of editing a font style of a chat content. First of all, when a chat content send key is touched in a preset manner, FIG. 9 and FIG. 10 show a process for providing an editing UI configured to provide an editing function of editing a chat content and enabling the chat content to reflect a result of the chat content editing via the editing UI.

Referring to FIG. 9, while a chat content 311 is input to the input window 220, if the send key 230 is touched in a preset manner (FIG. 9(a)), the controller 180 displays an editing UI 330 for editing a font style of the chat content 311 as an editing function assigned to the preset touch manner.

In this instance, the editing UI 330 may include a color editor 331 for editing a font color of the chat content 311, a size editor 332 for editing a font size of the chat content 311, and a font type editor 333 for editing a font type of the chat content 311. Moreover, referring to FIG. 10, the editing UI 330 may further include a word balloon editor for editing a word balloon displayed within the chat content display window 210.

For example, the controller 180 can provide a user with the editing UI 330 while the long touch to the send key 230 is maintained. In particular, the controller 180 can provide the user with the editing UI 330 for a preset duration after the editing UI 330 has been initially displayed. Moreover, if the user does not use the editing UI 330 for the preset duration, the controller 180 can stop providing the editing UI 330.

Referring to FIG. 9(b), if the user sets up a desired font size using the size editor 332, the controller 180 can change a font size of the chat content 311 into the set font size. In addition, if the user sets up a desired font color using the color editor 331, the controller 180 can change a font color of the chat content 311 into the set font color. Similarly, if the user sets up a desired font type using the font type editor 333, the controller 180 can change a font type of the chat content 311 into the set font type.

After the font style of the chat content 311 has been edited via the editing UI 330, if the touch is released from the send key 230 (FIG. 9(c)), the controller 180 sends the chat content 311, which is edited until the touch to the send key 230 is released, to the counterpart (FIG. 9(d)).

Referring to FIGS. 10(a) and 10(b), while the editing UI 330 including the word balloon editor is displayed, the user can select a desired word balloon style 334A using the word balloon editor. If the touch to the send key 230 is released (FIG. 10(c)), the controller 180 sends the chat content 311 to the counterpart and displays the sent chat content 311 in the set word balloon style 334A (FIG. 10(d)).

Referring to FIG. 11(a), as mentioned in the foregoing description with reference to FIG. 9 and FIG. 10, the controller provides the editing UI 330 for a preset duration. If the preset duration expires, referring to FIG. 11(b), the controller 180 can send the chat content 311, which is edited via the editing UI 330 for the preset duration, to the counterpart. In addition, the controller 180 displays information 335 indicating a countdown of the preset duration, thereby informing the user of the time for providing the editing UI 330.

Referring to FIGS. 12(a) to 12(c), while a chat content 311 is input to the input window 220, the send key 230 is long touched. While the long touch to the send key 230 is maintained, a font style of the chat content 311 can be changed. For instance, while the chat content 311 having 'font size 9' is input to the input window 220, if 1 second of a time taken to maintain the long touch to the send key 230 expires (FIG. 12(a)), the controller 180 changes a font size of the chat content 311 into '10' from the previous '9' (FIG. 12(b)). Moreover, if 2 seconds of the time taken to maintain the long touch to the send key 230 expires, the controller 180 changes the font size of the chat content 311 into '11' from the previous '10' (FIG. 12(c)).

After the font size of the chat content 311 has been changed, if the long touch to the send key 230 is cancelled (or released), referring to FIG. 12(d), the controller sends the chat content 311, of which font size is changed, to the chat counterpart. Meanwhile, as mentioned in the foregoing description with reference to FIG. 9 and FIG. 10, while the chat content 311 is input to the input window 220, if 1 second of the time taken to maintain the long touch to the send key 230 expires, the controller 180 may change a font color, a font type or a word balloon style of the chat content sequentially in proportion to the long touch maintained time.

Referring to FIG. 13(a) and FIG. 13(b), while a chat content 311 is input to the input window 220, if the send key 230 is long touched and then dragged in specific direction, a font style of the chat content 311 can be changed in response to a drag distance from the long touched point to the dragged point. For instance, if the send key 230 is long touched and then dragged in a top direction (or a left direction), referring to FIG. 13(b), the controller 180 changes a font size of the chat content 311 to 12 from 9 in proportion to the drag distance.

In particular, the controller 180 can increase the font size of the chat content 311 in proportion to the drag distance from the long touched point to the dragged point. After the font size of the chat content 311 has been changed, if the long touch to the send key 230 is cancelled, referring to FIG. 13(c), the controller 180 sends the font size changed chat content 311 to the chat counterpart (FIG. 13(d)).

Meanwhile, as mentioned in the foregoing description with reference to FIG. 9 and FIG. 10, while the chat content 311 is input to the input window 220, the controller 180 can change the font color, the font type or the word balloon style of the chat content 311 sequentially in proportion to the drag distance from the long touched point to the dragged point.

Figure 14:
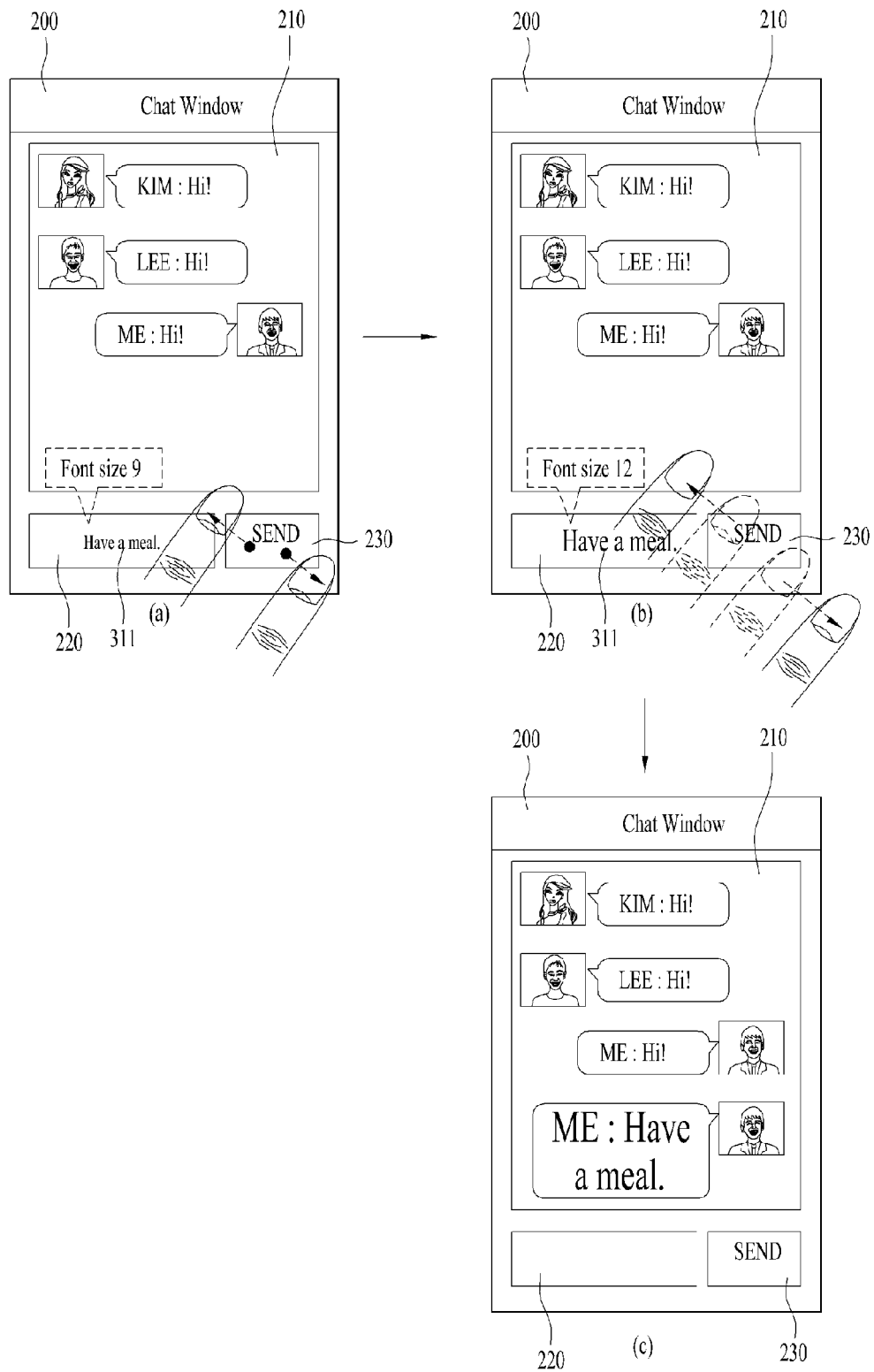

Referring to FIG. 14, while the chat content 311 is input to the input window 220, if a pinching-in/out multi-touch is input to the send key 230 (FIG. 14(a)), the controller 180 changes a font size of the chat content 311 in response to a pinching extent of the pinching-in/out multi-touch (FIG. 14(b)).

In this instance, while specific $1^{st}$ and $2^{nd}$ points on the send key 230 are multi-touched, the pinching-out multi-touch may correspond to a touch performed in a manner that a distance between the multi-touched $1^{st}$ and $2^{nd}$ points increases. In addition, while specific $1^{st}$ and $2^{nd}$ points on the send key 230 are multi-touched, the pinching-in multi-touch may correspond to a touch performed in a manner that a distance between the multi-touched $1^{st}$ and $2^{nd}$ points decreases. Moreover, the pinching extent may correspond to a distance extent between the multi-touched $1^{st}$ and $2^{nd}$ points.

In particular, referring to FIG. 14(b), the controller 180 increases the font size of the chat content 311 in proportion to the pinching extent of the pinching-out multi-touch or decreases the font size of the chat content 311 in inverse proportion to the pinching extent of the pinching-in multi-touch.

While the font size of the chat content 311 is changed in response to the pinching extent of the pinching-in/out multi-touch, if the pinching-in/out multi-touch is cancelled the controller 180 sends the font size changed chat content 311 to the counterpart (FIG. 14(c)).

Meanwhile, as mentioned in the foregoing description with reference to FIG. 9 and FIG. 10, while the chat content 311 is input to the input window 220, the controller 180 can change the font color, the font type or the word balloon style of the chat content 311 sequentially in response to the pinching extent of the pinching-in/out multi-touch to the send key 230.

Figure 15:
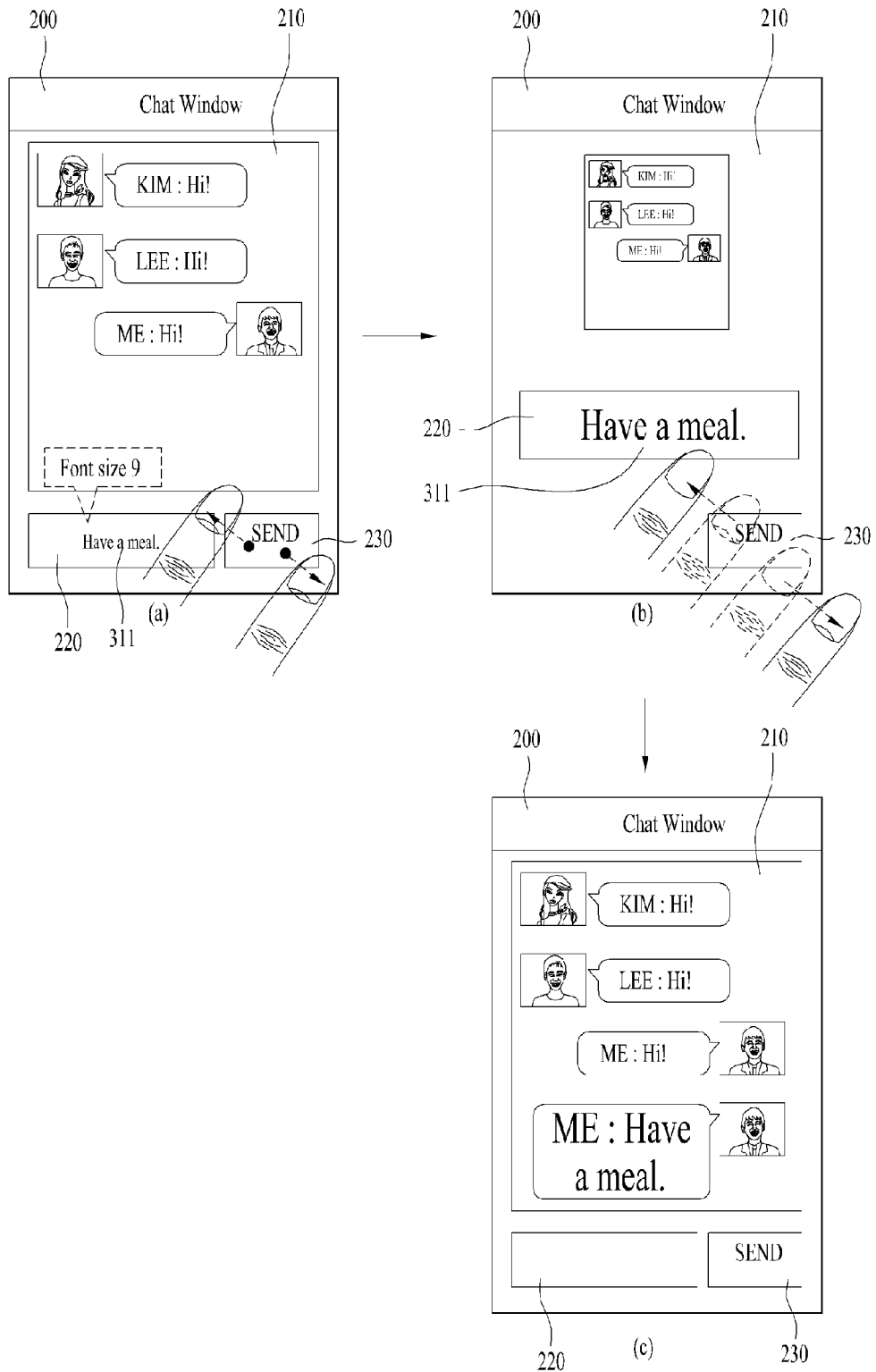

Referring to FIG. 15, while a chat content 311 is input to the input window 220, if a pinching-out multi-touch is input to the send key 230 (FIG. 15(a)), the controller 180 displays the input window 220 containing the chat content 311 by enlarging the input window 220 in response to the pinching extent of the pinching-out multi-touch (FIG. 15(b)). For example, the controller 180 can control the chat content display window 210 to be displayed by being reduced in inverse proportion to the enlarged extent of the input window 220.

While the chat content 311 is enlarged, if the pinching-out multi-touch is released from the send key 230, referring to FIG. 15(c), the controller 180 changes a font size of the chat content 311 into a size corresponding to the enlarged state of the chat content 311 and sends the font size changed chatting content 311 to the chat counterpart.

Figure 16:
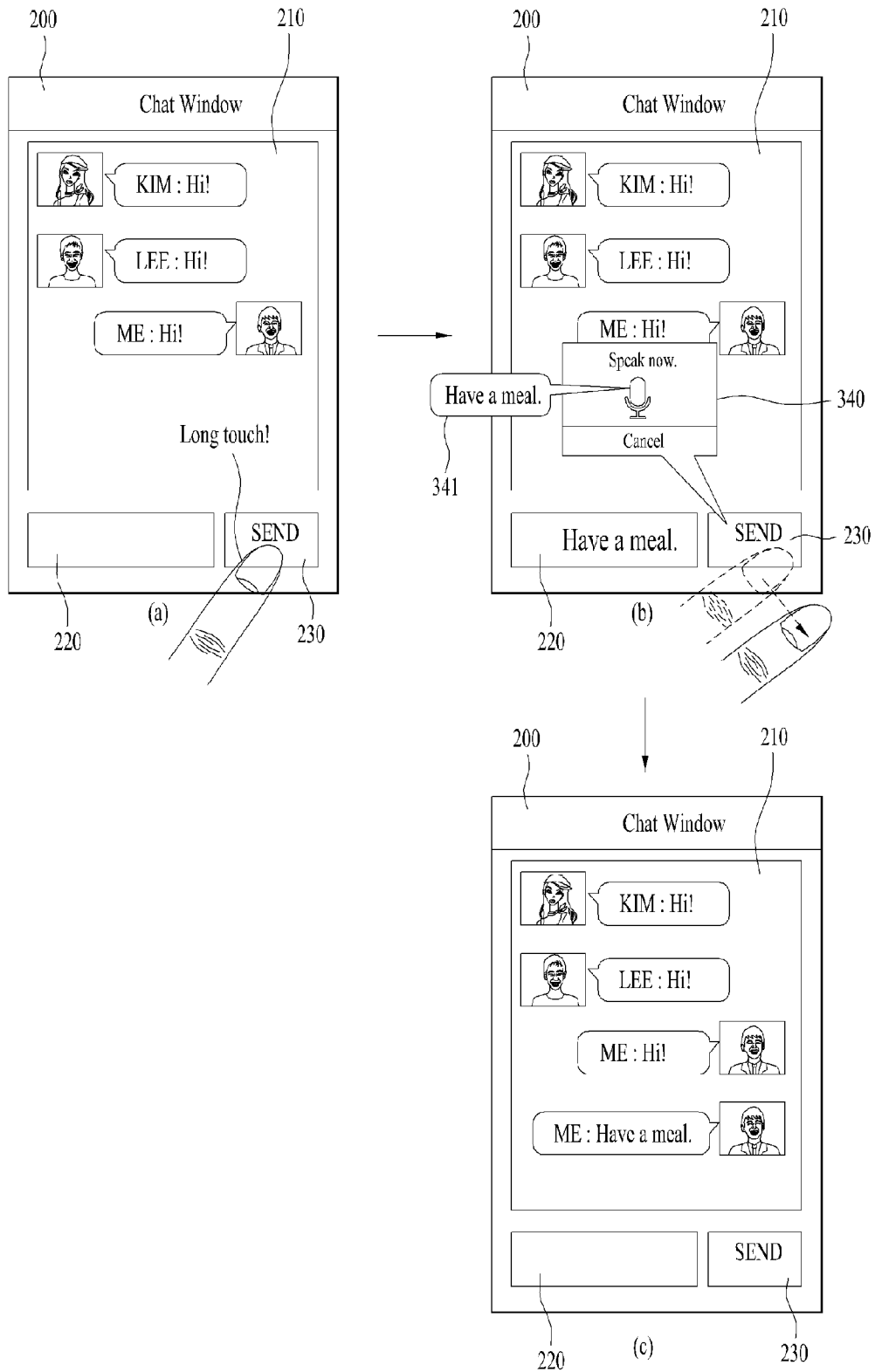

Next, FIG. 16 shows that an editing function, which is provided if a chat content send key is touched in a preset manner, is a voice recognition function. Referring to FIG. 16, if the send key 230 is touched in a preset manner (FIG. 16(a)), the controller 180 activates a voice recognition mode 340 and also activates the microphone 122 and a converting unit included in the controller 180.

If a voice 'Have a meal' 341, which is to be converted to a text is input as a chat content via the microphone 122, the controller 180 controls the converting unit to convert the input voice 'Have a meal' 341 to a text and then inserts the text into the input window 220 as a chat content (FIG. 16(b)).

While the text is inserted in the input window 220, if the send key 230 is input or the touch to the send key 230 is cancelled, referring to FIG. 16(c), the controller 180 sends the chat content inserted in the input window 220 to a chat counterpart. For example, while the long touch to the send key 230 is maintained, the controller 180 can provide a user with the voice recognition mode 340. If the long touch to the send key 230 is cancelled or released, the controller 180 can end the voice recognition mode 340.

Figure 17:
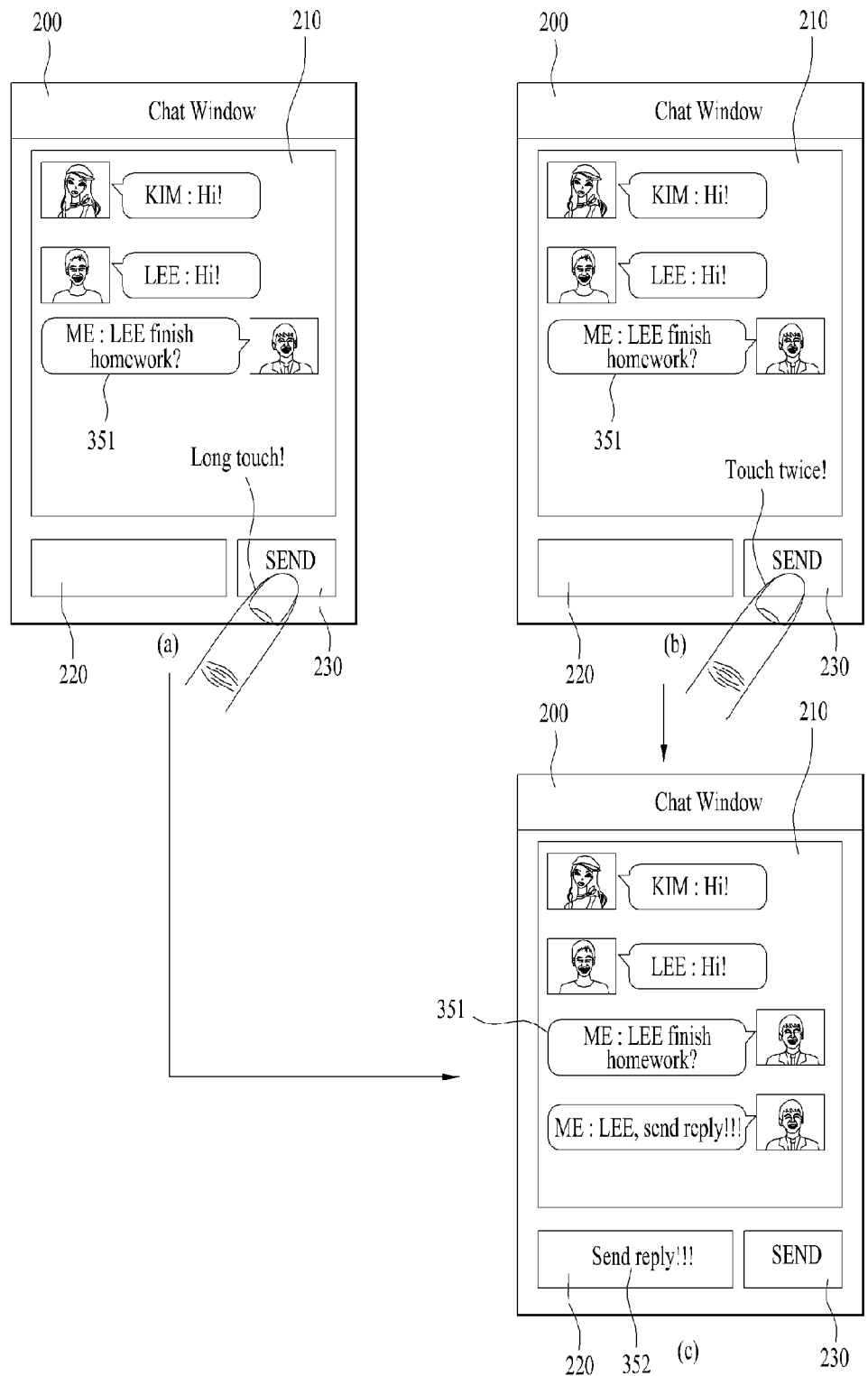

Next, FIG. 17 shows that an editing function, which is provided if a chat content send key is touched in a preset manner, is a function of making a request to a counterpart for a reply to a previously sent chat content. Referring to FIG. 17(a) and FIG. 17(b), after a chat content 351 has been set to a specific chat counterpart, if the send key 230 is touched in a preset manner, the controller 180 checks whether a reply for the sent chat content 351 is received from the specific chat counterpart.

In particular, the preset touch manner may include a long touch to the send key 230 (FIG. 17(a)). Alternatively, the preset touch manner may be performed by touching the send key 230 two times at least (FIG. 17(b)). As a result of the check, if the reply for the sent chat content 351 is not received from the specific chat counterpart, referring to FIG. 17(c), the controller 180 sends a chat content 352 for urging the specific counterpart to send the reply for the chat content 351. In this instance, the chat content 352 for urging the specific counterpart to send the replay may include a text previously set by a user or a text previously set in the mobile terminal 100.

Figure 18:
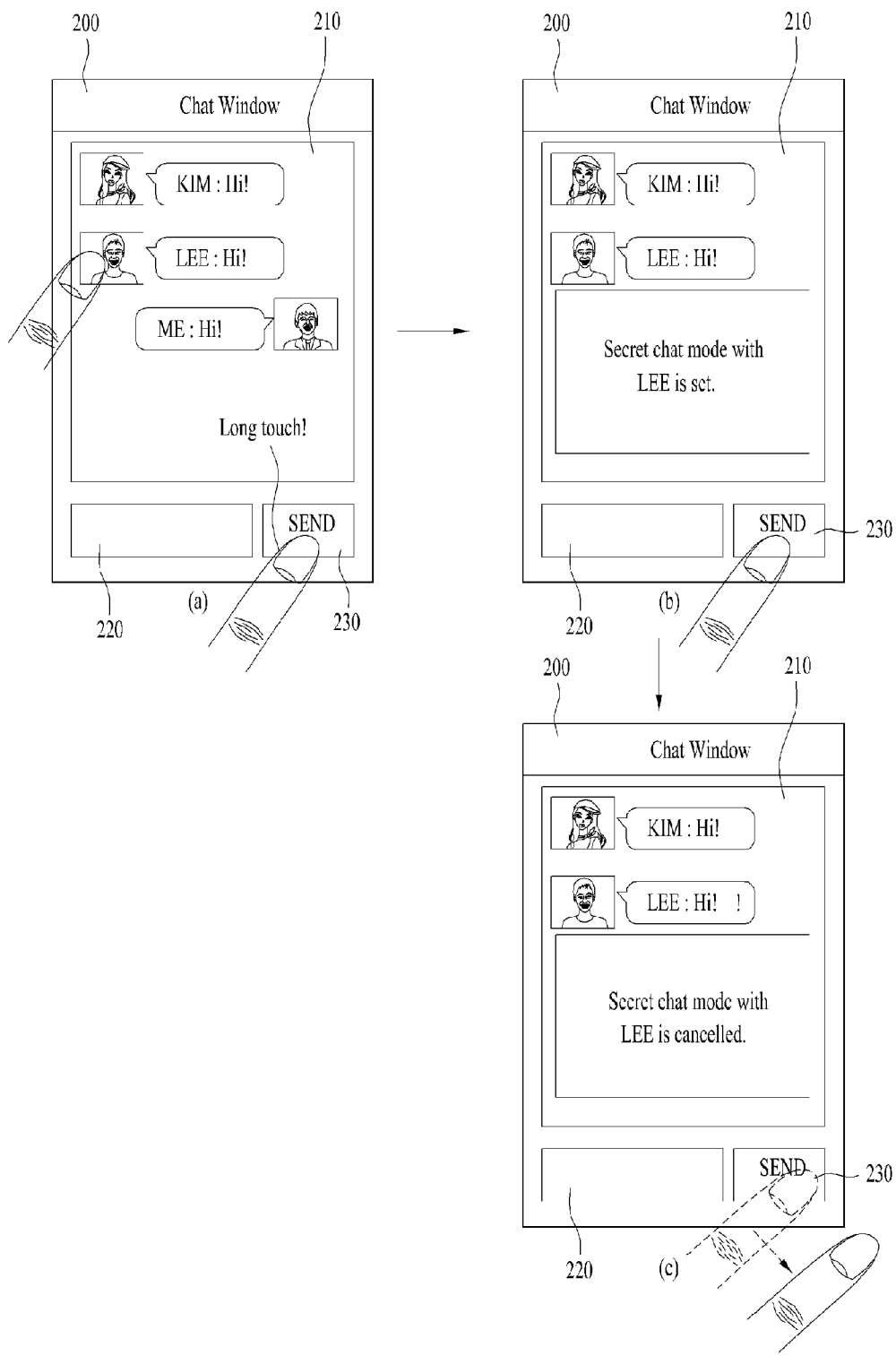

Next, FIG. 18 shows that an editing function, which is provided if a chat content send key is touched in a preset manner, is a function of providing a secret chat with a specific counterpart among a plurality of chat counterparts. Referring to FIG. 18, after the send key 230 has be touched in a preset manner, if a specific counterpart 'LEE' is selected from a plurality of chat counterparts (FIG. 18(a)), the controller 180 activates a secret chat mode for a secret chat with the specific counterpart 'LEE' and then sends a chat content created by a user to the specific counterpart 'LEE' only (FIG. 18(b)).

In this instance, the preset touch manner of the touch to the send key 230 may include a long touch. Only if the long touch to the send key 230 is maintained, the controller 180 can provide a secret chat function of the secret chat with the specific counterpart 'LEE' to the user. If the long touch to the send key 230 is cancelled, referring to FIG. 18(c), the controller 180 can end the secret chat mode of the secret chat with the specific counterpart 'LEE'.

Figure 19:
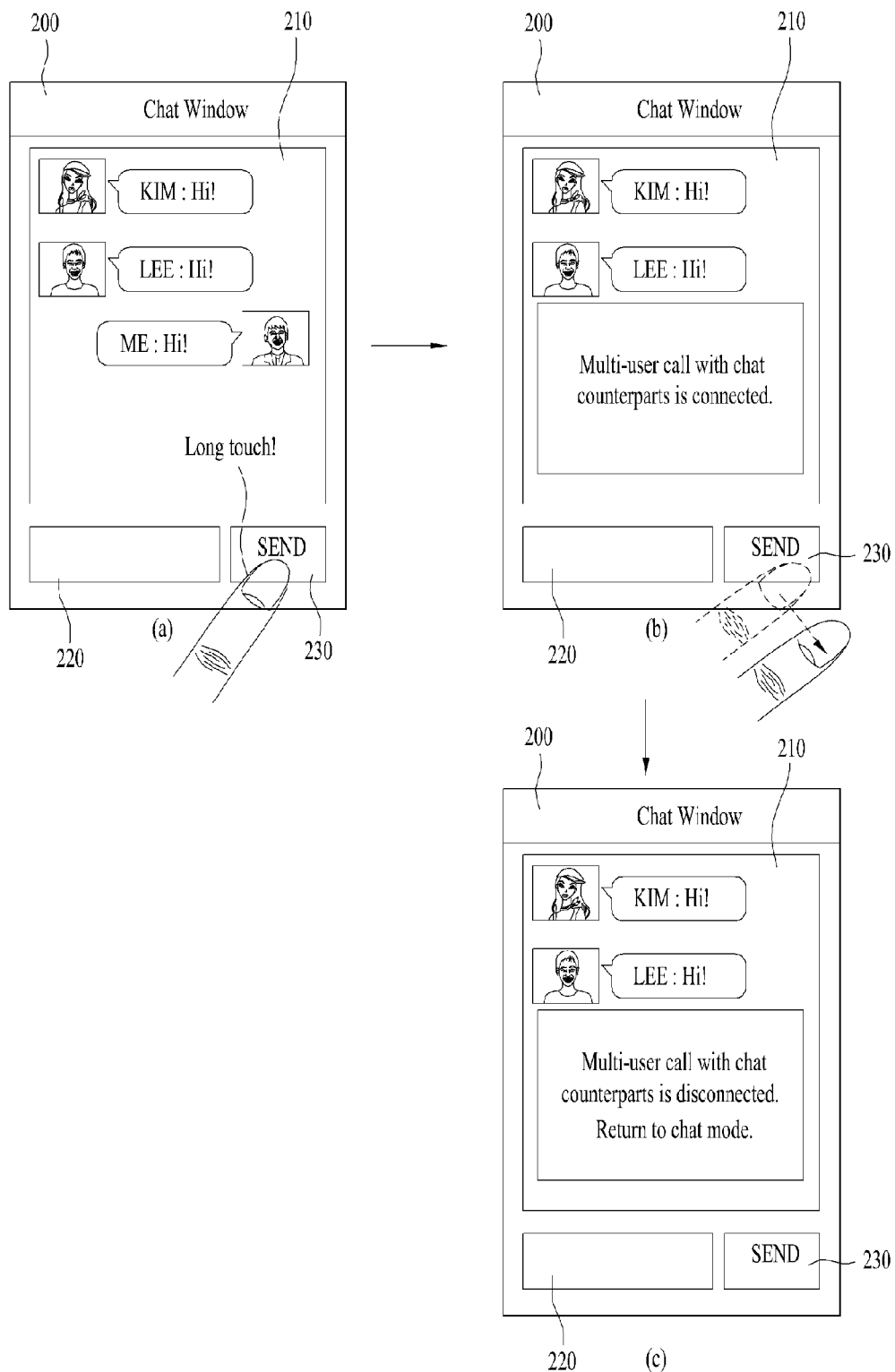
Figure 20:
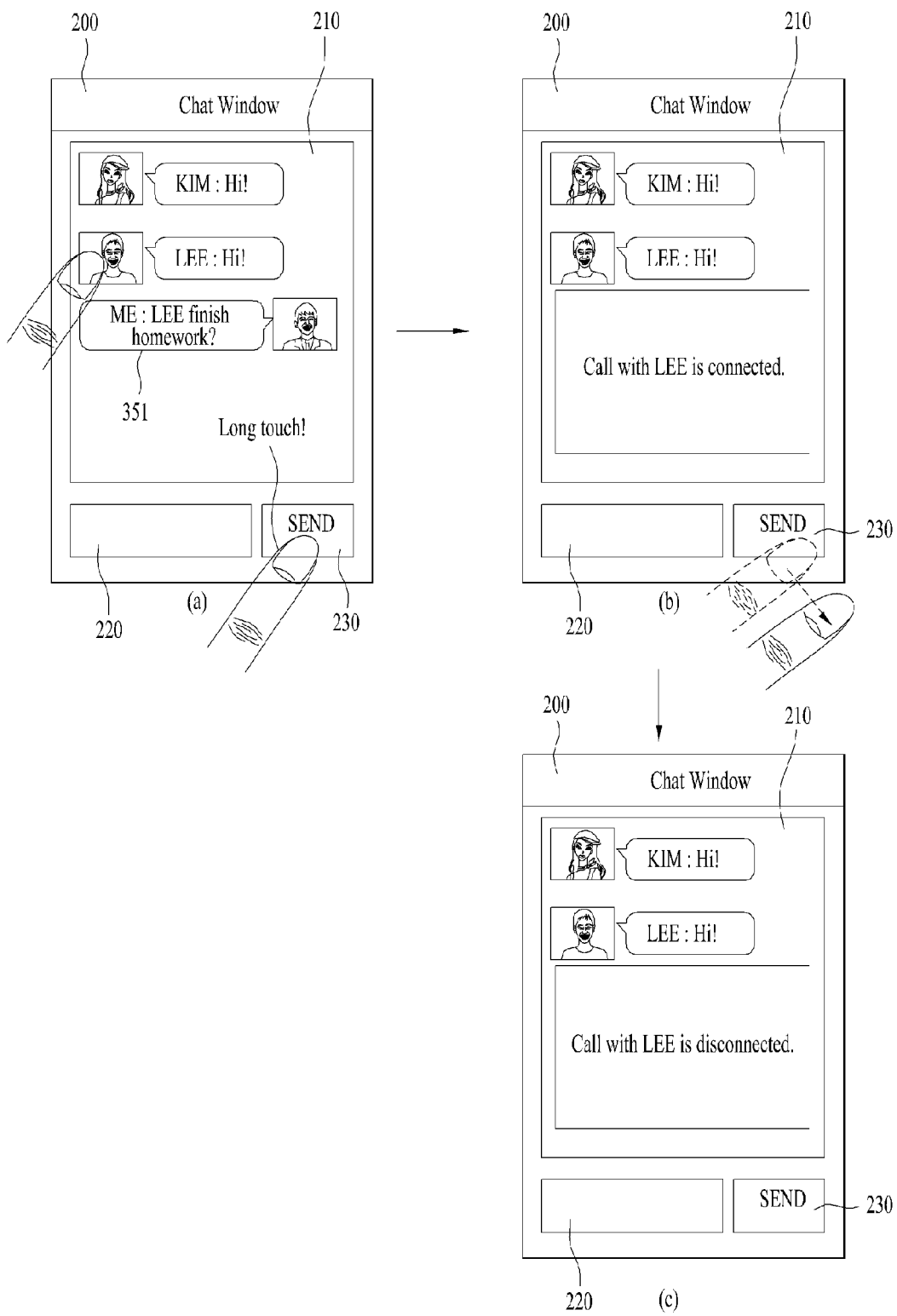
Figure 21:
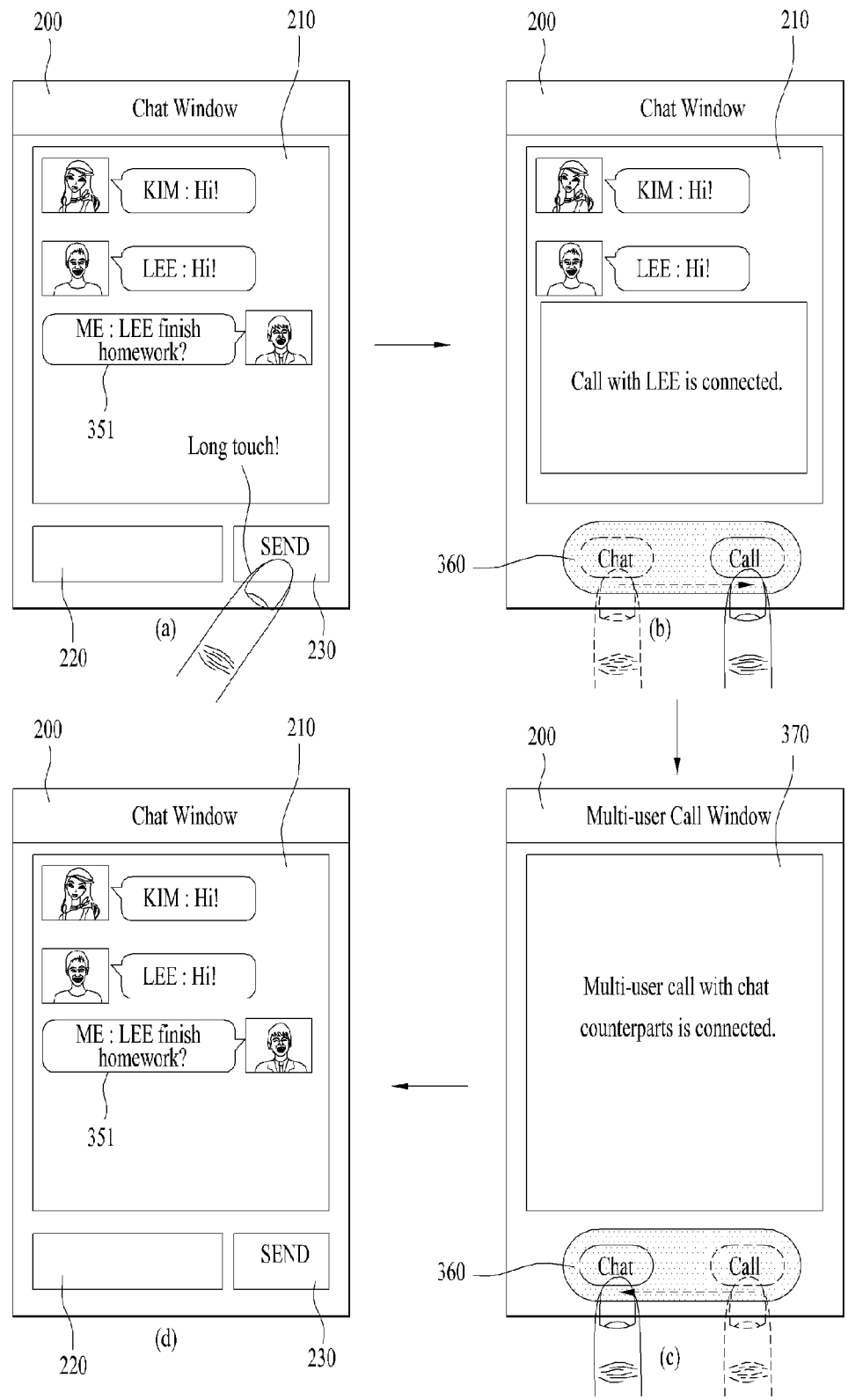

Next, FIGS. 19 to 21 show that an editing function, which is provided if a chat content send key is touched in a preset manner, is a function of changing a chat mode into a multi-user call mode. Referring to FIG. 19, if the send key 230 is touched in a preset manner (FIG. 19(a)), the controller 180 changes a chat mode of a chat with a current counterpart into a multi-user call mode and then connects a multi-user call with chat counterparts via the wireless communication unit 110 (FIG. 19(*b*)).

In this instance, the preset touch manner of the touch to the send key 230 may include a long touch. Only if the long touch to the send key 230 is maintained, the controller 180 can provide a multi-user call function to the chat counterparts. If the long touch to the send key 230 is cancelled, referring to FIG. 19(*c*), the controller 180 ends the multi-user call mode for the multi-user call with the chat counterparts and can then activate the chat mode of the chat with the counterpart again.

Referring to FIG. 20(*a*), after the send key 230 has been touched in the preset manner, if a specific counterpart 'LEE' is selected from the chat counterparts (FIG. 20(*a*)), the controller activates a call mode for a call with the specific counterpart 'LEE' and then connects the call with the specific counterpart 'LEE' via the wireless communication unit 110 (FIG. 20(*b*)).

In this instance, the preset touch manner of the touch to the send key 230 may include a long touch. Only if the long touch to the send key 230 is maintained, the controller 180 can provide a call function of a call with the specific counterpart 'LEE'. If the long touch to the send key 230 is cancelled, referring to FIG. 20(*c*), the controller 180 ends the call mode of the call with the specific counterpart and may be then able to activate the chat mode of the chat with the counterpart again.

Referring to FIG. 21, if the send key 230 is touched in a preset manner (FIG. 21(*a*)), the controller 180 displays a UI 360 for changing the current chat mode of the chat with the counterpart into a multi-user call mode (FIG. 21(*b*)). If a $1^{st}$ command for changing the chat mode into the multi-user call mode is input via the UI 360, referring to FIG. 21(*b*), the controller 180 changes the chat mode into the multi-user call mode and then connects a multi-user call with the chat counterparts via the wireless communication unit 110 (FIG. 21(*c*)).

Moreover, while the multi-user call mode is active, if a $2^{nd}$ command for changing the multi-user call mode into the chat mode is input via the UI 360 (FIG. 21(*c*)), the controller 180 changes the multi-user call mode into the chat mode (FIG. 21(*d*)).

In the following description, when the specific key is the character input key in the keypad shown in FIG. 4, and if the character input key is touched in a preset manner, before a character corresponding to the touched character input key is displayed on a chat content input window, a process for providing a user with an editing function of editing the character is described in detail with reference to FIGS. 22 to 27.

Figure 22:
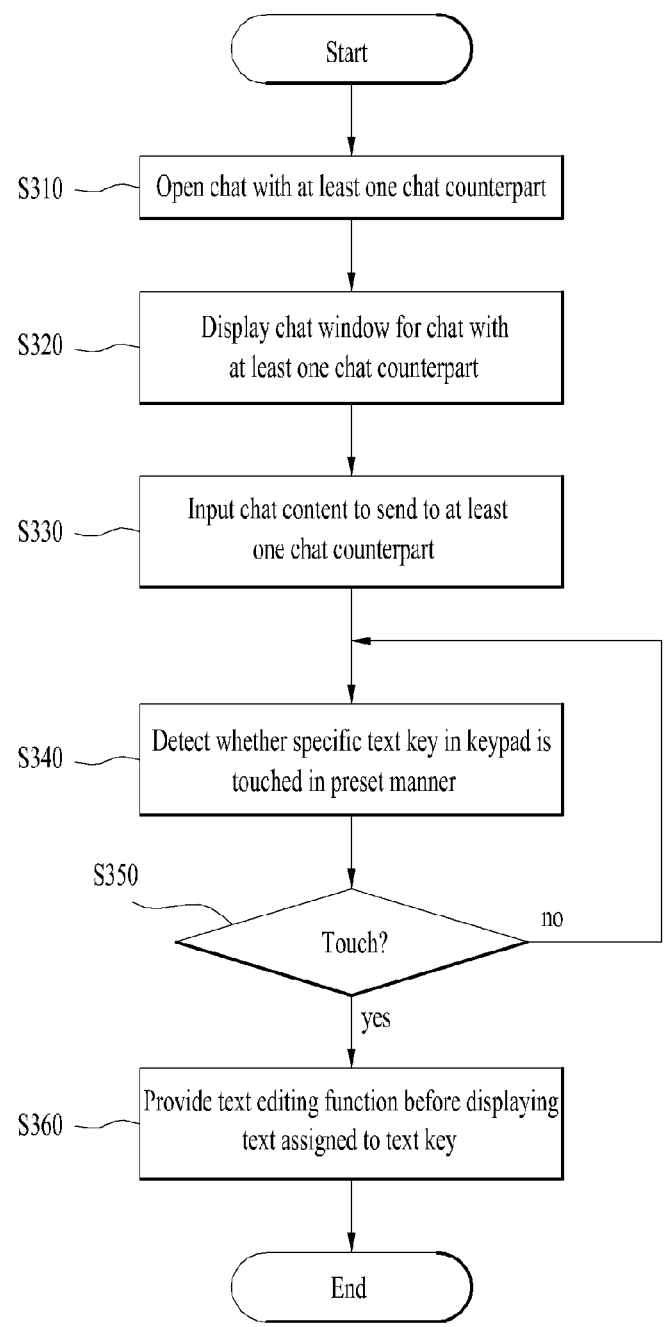

In particular, FIG. 22 is a flowchart illustrating a method of providing an editing function of editing a chat content using text input keys according to an embodiment of the present invention, and FIGS. 23 to 27 are diagrams of display screen configurations to implement a method for providing a chat content editing function using text input keys according to an embodiment of the present invention.

Referring to FIG. 22, the controller 180 opens a chat with at least one counterpart belonging to a preset group or selected by a user (S310) and displays a chat window for the chat with the at least one counterpart on the touchscreen 151 (S320). For example, the chat window may include a keypad having a plurality of text input keys, a chat content input window configured to display a text input via the text input keys, and a chat content display window configured to display chat contents transceived with the at least one chat counterpart.

If the chat content to be transmitted to the counterpart is input via the chat content input window (S330), the controller 180 detects whether a specific text input key among a plurality of the text input keys of the keypad is touched in a preset manner (S340). Further, the step S330 may be skipped. If the step S330 is skipped, when the chat window is displayed, the controller 180 can detect whether the specific text input key is touched in the preset manner.

If the controller 180 detects that the specific text input key is touched in the preset manner (Yes in S350), the controller 180 provides the editing function of editing the text assigned to the specific text input key before displaying the text assigned to the specific text input key on the chat content input window (S360). Moreover, if the controller 180 detects that the specific text input key is touched in the preset manner, the controller 180 can provide the editing function of editing a chat content already displayed on the chat content input window. If the controller 180 detects that the specific text input is not touched in the preset manner (No in S350), the controller 180 returns to step S340.

In this instance, the editing function of the text assigned to the text input key may include at least one of a font style editing function of editing a font style (e.g., a font type, a font size, a font color, etc.) of the text assigned to the specific text input key, a word balloon style editing function of editing a word balloon for displaying the chat content thereon, an emoticon insert function and the like.

Moreover, the editing function of editing a chat content already displayed on the chat content input window may include at least one of a font style editing function of editing a font style (e.g., a font type, a font size, a font color, etc.) of the chat content, a word balloon style editing function of editing a word balloon for displaying the chat content thereon, an emoticon insert function and the like.

If the specific text input key is touched in the preset manner, the controller 180 activates the editing function while the touch to the specific text input key is maintained and then provides the activated editing function to the user. If the touch is released from the specific text input key, the controller 180 displays the edited chat content.

As discussed previously, if the specific text input key is touched in the preset manner, the controller 180 provides the editing function for a preset duration. If the preset duration expires, the controller 180 can display the chat content edited for the preset duration on the chat content input window. For example, the controller 180 displays information (e.g., 5 seconds→4 seconds→3 seconds→2 seconds→1 second→transmit) indicating a countdown of the preset duration, thereby informing the user of the time during which the editing function keeps being provided.

After the specific text input key has been touched in the preset manner, while the editing function is being provided, the controller 180 checks whether the editing function is used by the user. If the editing function is not used by the user for the preset duration, the controller 180 stops providing the editing function or may display the chat content edited so far on the chat content input window.

In the following description, the steps S340, S350 and S360 are explained in detail with reference to FIGS. 23 to 27. When a specific text input key in a keypad is touched in a preset manner, FIG. 23 and FIG. 24 show a process for providing an editing UI configured to provide an editing function of editing a character (e.g., letter, numeral, symbol, etc.) assigned to the specific text input key and enabling the chat content to reflect a result edited via the editing UI.

Figure 23:
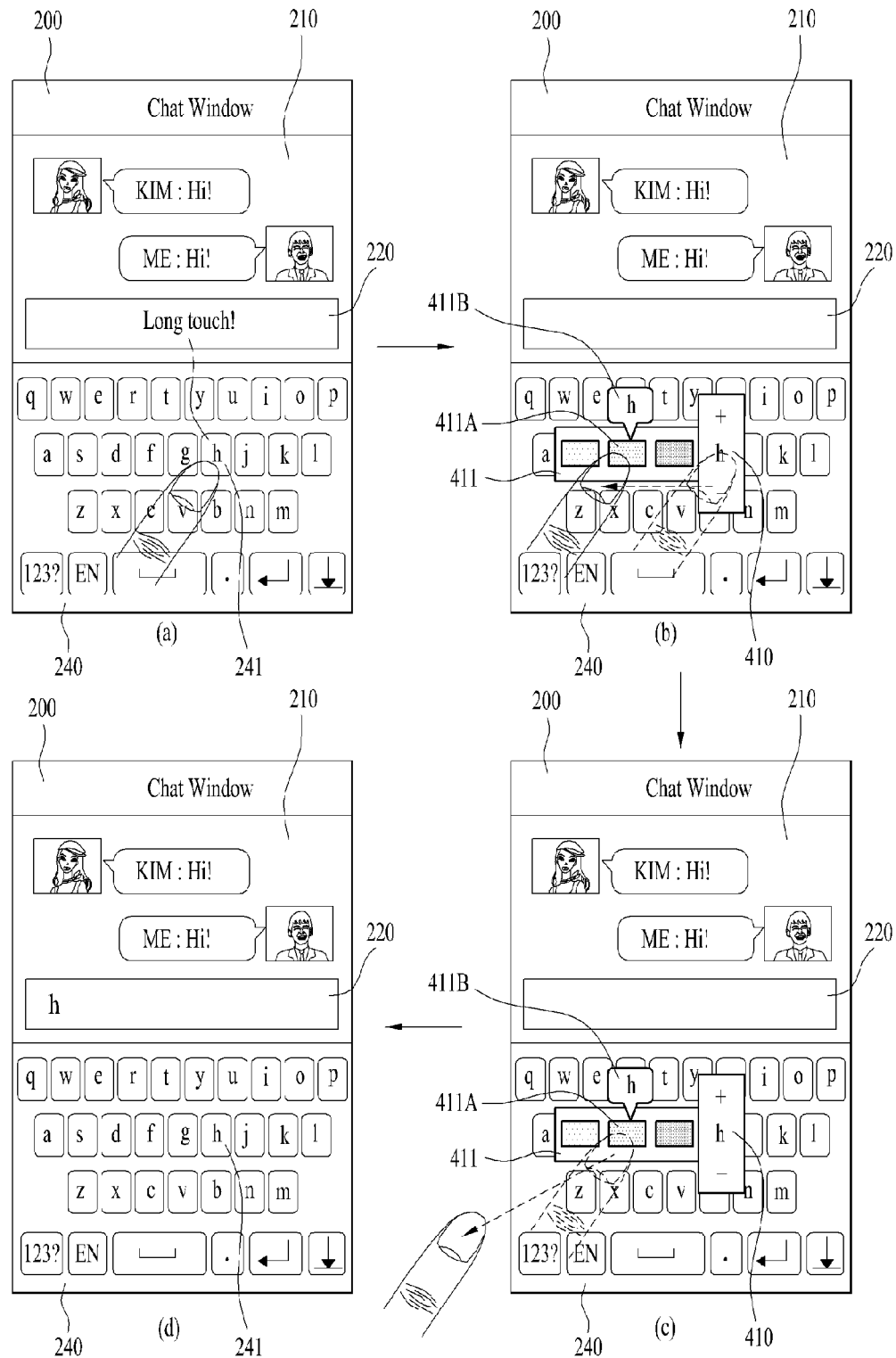
Figure 24:
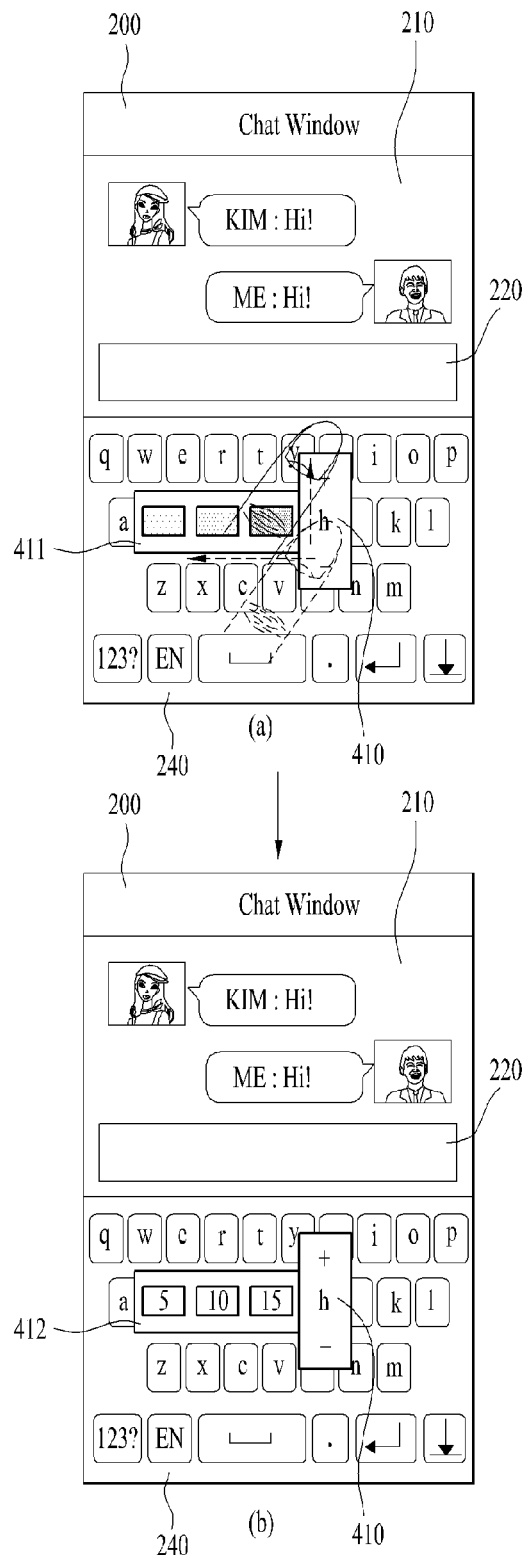

Referring to FIG. 23, if a specific text input key 'h' 241 in a keypad 240 is touched (FIG. 23(a)), the controller 180 displays an editing UI 410 for editing a font style of a character 'h' assigned to the specific text input key 'h' 241 as an editing function assigned to the preset touch manner (FIG. 23(b)).

In this instance, the editing UI 410 may include a color editor 411 for editing a font color of the character 'h' assigned to the specific text input key 'h' 241, a size editor 412 (FIG. 24) for editing a font size of the character 'h' assigned to the specific text input key 'h' 241, and a font type editor for editing a font type of the character 'h' assigned to the specific text input key 'h' 241.

In particular, as mentioned in the foregoing description with reference to FIG. 9, the color editor 411, the size editor 412 and the font type editor may be displayed within the editing UI 410 together. Alternatively, the color editor 411, the size editor 412 and the font type editor may be displayed within the editing UI 410 by being swapped with each other (FIG. 24).

Referring to FIG. 24, the controller 180 displays one of the color editor 411, the size editor 412 and the font type editor on the editing UI 410 in the first place (e.g., the color editor 411 is explained as first displayed in the following description) (FIG. 24(a)). In response to a user's touch manipulation on the editing UI 410, the controller 180 can control the color editor 411, the size editor 412 and the font type editor to be alternately displayed on the editing UI 410 (FIG. 24(b)).

For instance, while the color editor 411 is displayed on the editing UI 410, if a user applies a top-directional drag touch action to the editing UI 410, the controller 180 displays the size editor 412 on the editing UI 410. If the user inputs a top-directional drag touch action to the editing UI 410 again, the controller 180 displays the font type editor.

While the size editor 412 is displayed on the editing UI 410, if the user inputs a bottom-direction drag touch action to the editing UI 410, the controller 180 displays the color editor 411, which was displayed before the size editor 412 is displayed.

Meanwhile, FIG. 23 shows that the color editor 411 is first displayed on the editing UI 410. For example, while a long touch to the specific text input key 'h' 241 is maintained, the controller 180 can provide the editing UI 410 to the user. In particular, the controller 180 can provide the editing UI 410 for preset duration after the editing UI 410 has been initially displayed. If the user does not use the editing UI 410 for the preset duration, the controller 180 can stop displaying the editing UI 410.

Referring to FIGS. 23(b) to 23(d), if the user sets a desired font color 411A via the color editor 411 within the editing UI 410, the controller 180 determines a color of the character 'h' assigned to the specific text input key 'h' 241 as the set font color 411A and then displays the character 'h' in the set font color 411A on the text input window 220.

For instance, while a user's touch is maintained at a specific point on the editing UI 410, if the user's touch is dragged to a position, at which the desired font color 411A in the color editor 411 is represented, and then released (FIGS. 23(b) and 23(c)), the controller 180 determines the font color 411A situated at the touch released point as the color of the character 'h' assigned to the specific text input key 'h' 241 and then controls the character 'h' of the determined font color 411A to be displayed on the text input window 220.

Moreover, referring to FIGS. 23(b) and 23(c), if the user's touch is dragged to a position at which the desired font color 411A in the color editor 411 is displayed, the controller 180 may display information 411B indicating a state that the font color 411A is applied to the character 'h' in advance, thereby enabling the user to be aware of a result of editing the character 'h' in advance.

Figure 25:
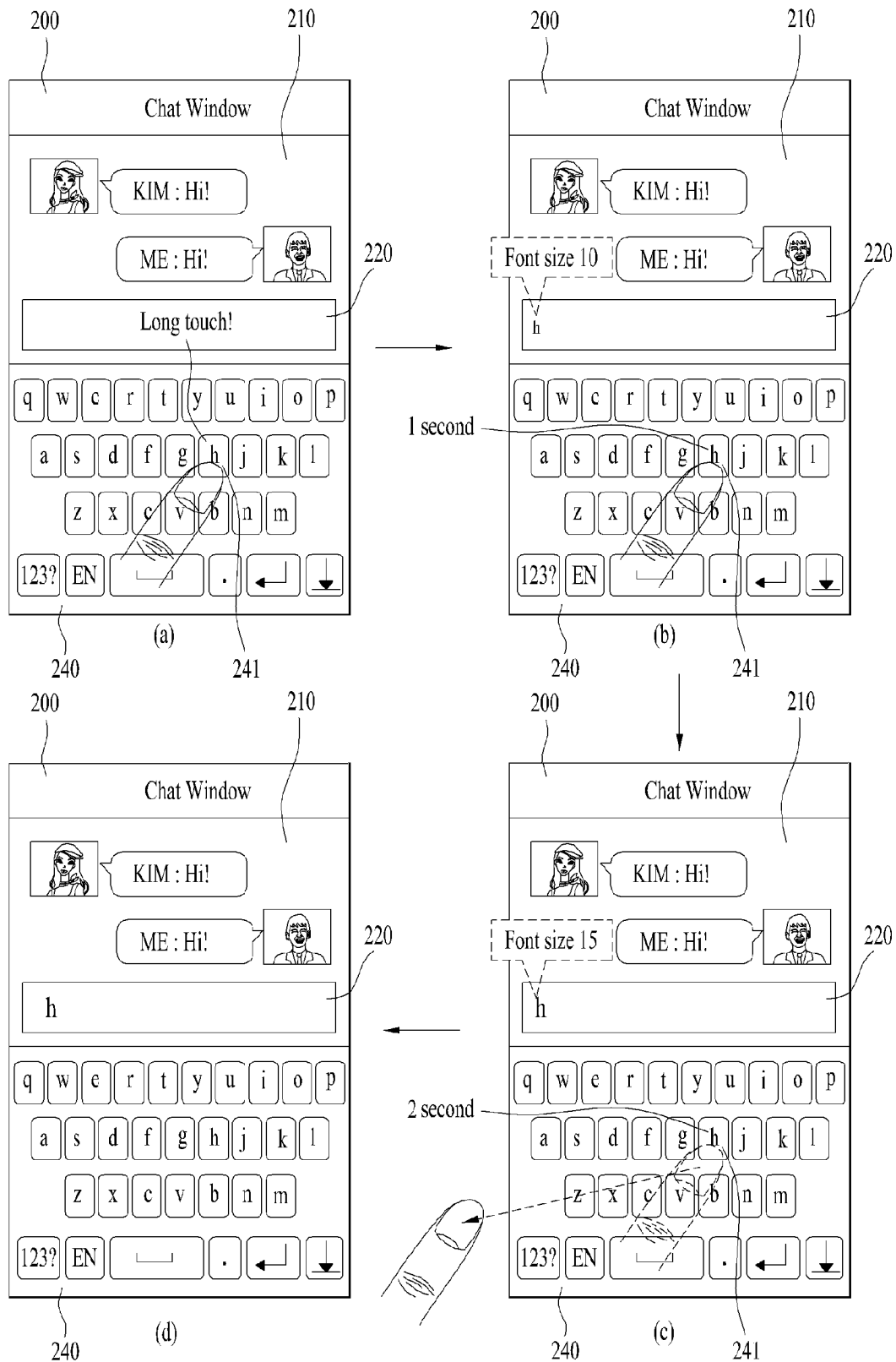
Figure 26:
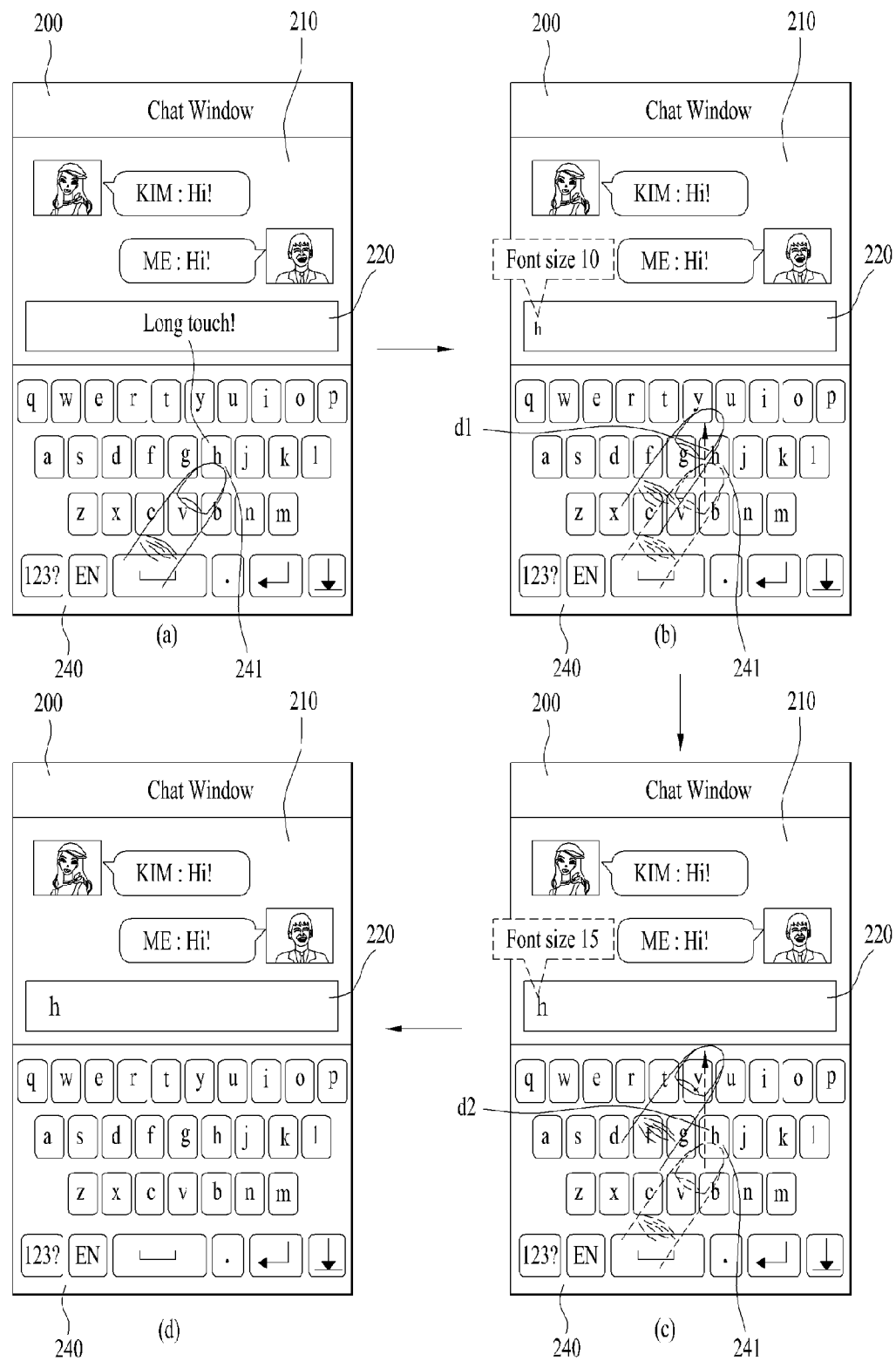
Figure 27:
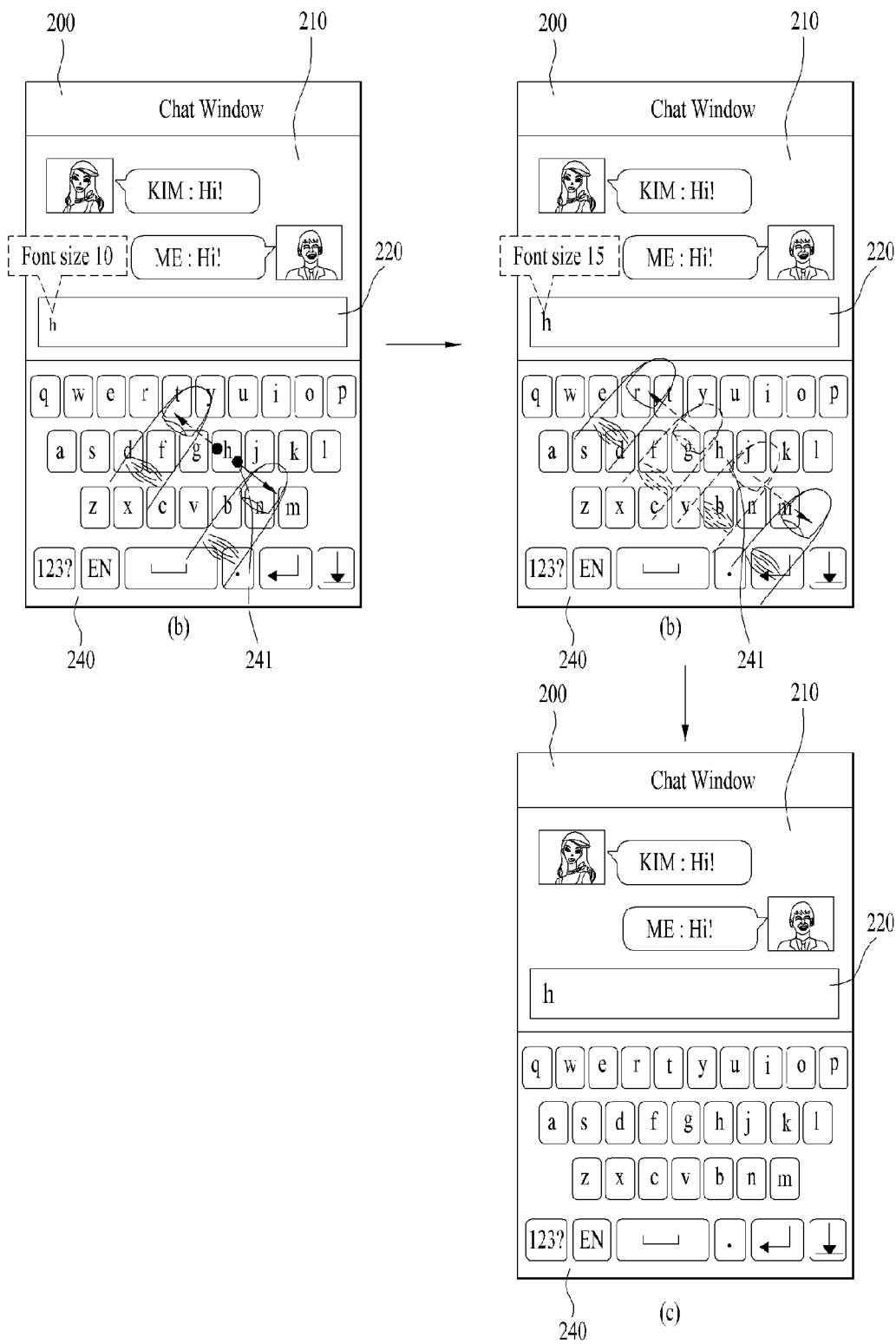

Referring to FIGS. 25 to 27, if the specific text input key 'h' 241 of the keypad 240 is touched in a preset manner, the controller 180 can change a font style of the character 'h' assigned to the specific text input key 'h' 241 in response to a time taken to maintain the touch to the specific text input key 'h' 241. In this instance, the preset touch manner may include a long touch to the specific text input key 'h' 241.

For instance, when the specific text input key 'h' 241 is long touched (FIG. 25(a)), if 1 second of the time taken to maintain the long touch to the specific text input key 'h' 241 elapses, the controller 180 sets the font size of the character 'h' assigned to the specific text input key 'h' 241 into '10' (FIG. 25(b)).

In another instance, when the specific text input key 'h' 241 is long touched, if 2 seconds of the time taken to maintain the long touch to the specific text input key 'h' 241 elapses, the controller 180 changes the font size of the character 'h' assigned to the specific text input key 'h' 241 into '15' from '10' (FIG. 25(c)).

Thus, while the font size of the character 'h' assigned to the specific text input key 'h' 241 is changed, if the touch to the specific text input key 'h' 241 is cancelled (FIG. 25(c)), the controller 180 controls the font size changed character 'h' to be displayed on the chat content input window 220 (FIG. 25(d)). Meanwhile, the controller 180 can change the font color or type of the character 'h' assigned to the specific text input key 'h' 241 sequentially in proportion to the long touch maintained time of the specific text input key 'h' 241.

Referring to FIG. 26, if the specific text input key 'h' 241 is long touched and then dragged in specific direction, the controller 180 can change the font style of the character 'h' assigned to the specific text input key 'h' 241 in response to a drag distance from the long touched point and the dragged point.

For instance, referring to FIG. 26(a) and FIG. 26(b), after the specific text input key 'h' 241 has been long touched and dragged in the top direction (or left direction) by a distance d1, the controller 180 changes or sets the font size of the character 'h' assigned to the specific text input key 'h' 241 into 10 amounting to the dragged distance d1.

Referring to FIG. 26(c), if the drag distance of the specific text input key 'h' 241 is changed into d2 from d1, the controller 180 may change the font size assigned to the specific text input key 'h' 241 from 10 to 15 amounting to the dragged distance d2. In particular, the controller 180 can increase the font size of the character 'h' assigned to the specific text input key 'h' 241 in proportion to the drag distance from the long touched point to the dragged point.

After the font size of the character 'h' assigned to the specific text input key 'h' 241 has been changed, if the touch to the specific text input key 'h' 241 is cancelled (FIG. 26(c)), the controller 180 controls the font size changed character 'h' to be displayed on the chat content input window 220 (FIG. 26(d)).

Meanwhile, as mentioned in the foregoing description with reference to FIG. 9 and FIG. 10, after the chat content 311 has been input to the input window 220, the controller 180 changes the font color, the font type or the word balloon style of the chat content 311 sequentially in proportion to the drag distance from the long touched point to the dragged point.

In addition, the controller 180 can change the font color or the font type of the character 'h' assigned to the specific text input key 'h' 241 sequentially in proportion to the dragged distance of the specific text input key 'h' 241.

Referring to FIG. 27, if a pinching-in/out multi-touch is input onto the specific text input key 'h' 241, the controller 180 can change the font style of the character 'h' assigned to the specific text input key 'h' 241 in response to a pinching extent of the pinching-in/out multi-touch.

In this instance, while specific $1^{st}$ and $2^{nd}$ points on the specific text input key 'h' 241 are multi-touched, the pinching-out multi-touch may correspond to a touch performed in a manner that a distance between the multi-touched $1^{st}$ and $2^{nd}$ points increases. In addition, while specific $1^{st}$ and $2^{nd}$ points on the specific text input key 'h' 241 are multi-touched, the pinching-in multi-touch may correspond to a touch performed in a manner that a distance between the multi-touched $1^{st}$ and $2^{nd}$ points decreases. Moreover, the pinching extent may correspond to a distance extent between the multi-touched $1^{st}$ and $2^{nd}$ points.

In particular, referring to FIG. 27(a) and FIG. 27(b), the controller 180 increases the font size of the character 'h' assigned to the specific text input key 'h' 241 in proportion to the pinching extent of the pinching-out multi-touch or decreases the font size of the character 'h' assigned to the specific text input key 'h' 241 in inverse proportion to the pinching extent of the pinching-in multi-touch.

While the font size of the character 'h' assigned to the specific text input key 'h' 241 is changed in response to the pinching extent of the pinching-in/out multi-touch, if the pinching-in/out multi-touch is cancelled (FIG. 27(c)), the controller 180 displays the font size changed character 'h' on the chat content input window 220.

Meanwhile, the controller 180 can change the font color, the font type or the word balloon style of the character 'h' assigned to the specific text input key 'h' 241 in response to the pinching extent of the pinching-in/out multi-touch to the specific text input key 'h' 241.

Figure 28:
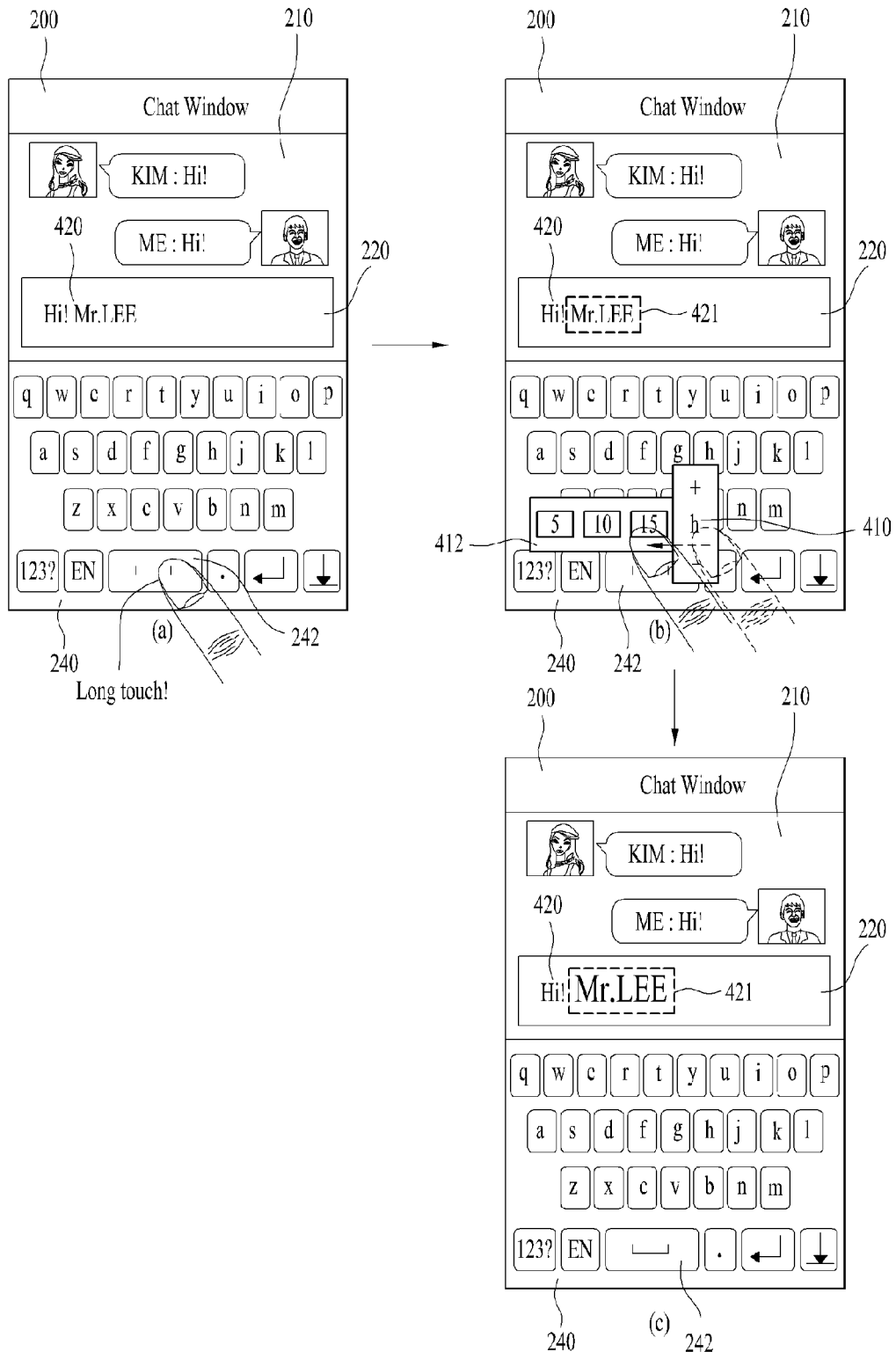

If a function key, to which a function of shifting (or spacing) a cursor by 1 box within a chat content input window 220 is assigned, of the keypad 240 is touched in a preset manner, FIG. 28 shows a process for providing an editing function of editing one of a recently input character, word and sentence of a chat content previously displayed on the chat content input window 220 or the whole chat content instead of providing a unique function (e.g., 1-box shift or spacing) of the function key.

For instance, FIG. 28(a) shows that a specific chat content 'Hi! Mr. LEE' 420 is already input to the chat content input window 220 by a user and that a function key, to which the 1-box shift (or spacing) function of the cursor is assigned, is a space bar 242 of the keypad 240. In this instance, the preset touch manner may include a long touch to the space bar 242.

If the space bar 242 is long touched (FIG. 28(a)), the controller 180 displays an editing UI 410 configured to provide an editing function of editing a most recently input word 'Mr. Lee' in the chat content 420 and then displays an editing result edited via the editing UI 410 by applying the editing result to the word 'Mr. LEE' (FIG. 28(b) and FIG. 28(c)). The editing process using the editing UI 410 may be performed in the same manners described with reference to FIG. 23 and FIG. 24.

In particular, if the space bar 242 is long touched, the controller 180 displays the editing UI 410, which provides the editing function of editing the word 'Mr. LEE' 421, around the space bar 242. If a specific font size 412A is set via the editing UI 410, the controller 180 can change the font size of the word 'Mr. LEE' 421 into the set font size 412A (FIG. 29).

The controller 180 can provide the editing function of editing the word 'Mr. LEE' 421 in proportion to a long-touch maintained time of the space bar 242 in the same manner described with reference to FIG. 25, provide the editing function of editing the word 'Mr. LEE' 421 in proportion to a drag distance of the space bar 242 in the same manner described with reference to FIG. 26, and provide the editing function of editing the word 'Mr. LEE' 421 in response to a pinching extent of a pinching-in/out multi-touch input to the space bar 242 in the same manner described with reference to FIG. 27.

Figure 29:
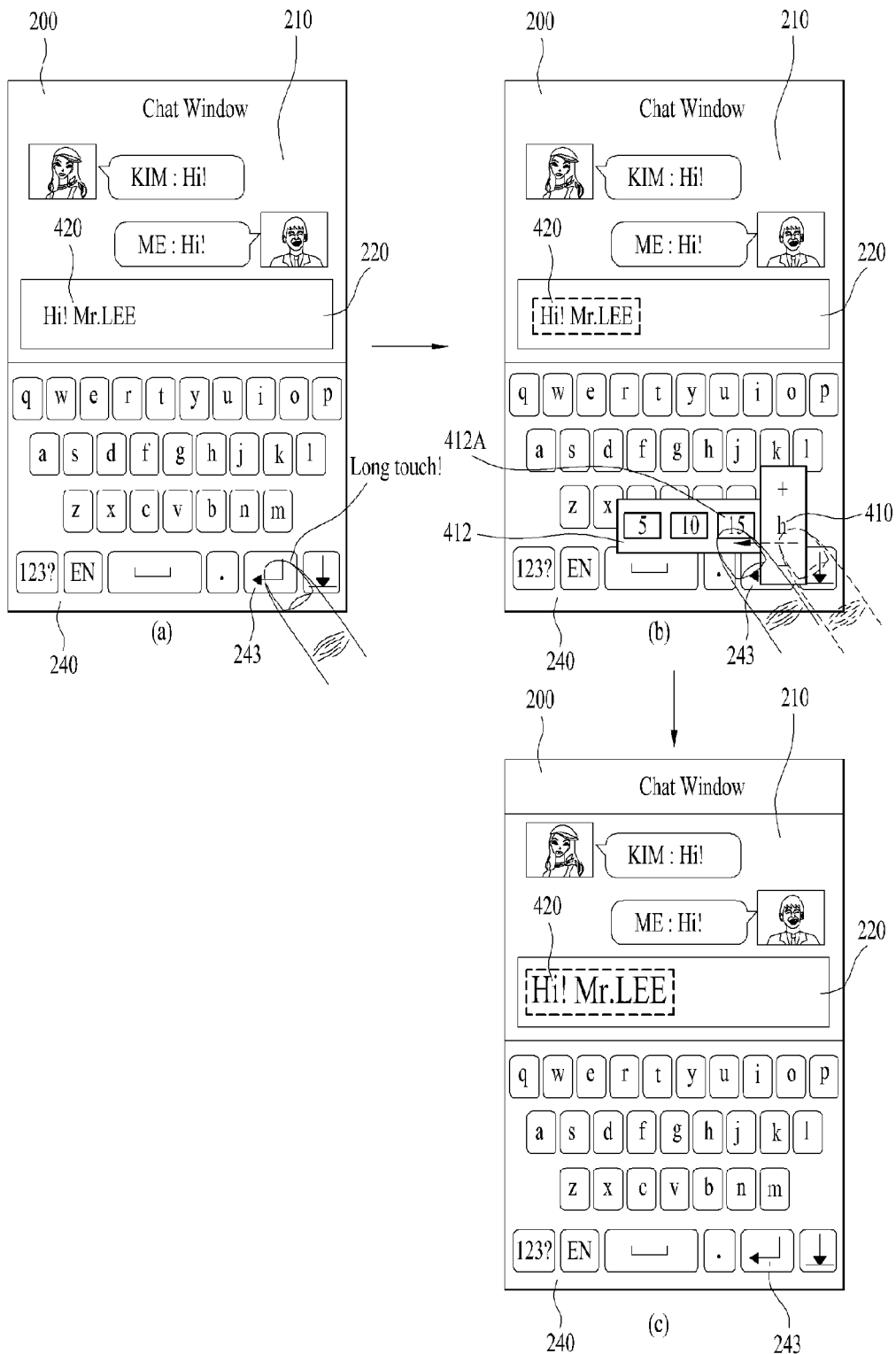
Figure 30:
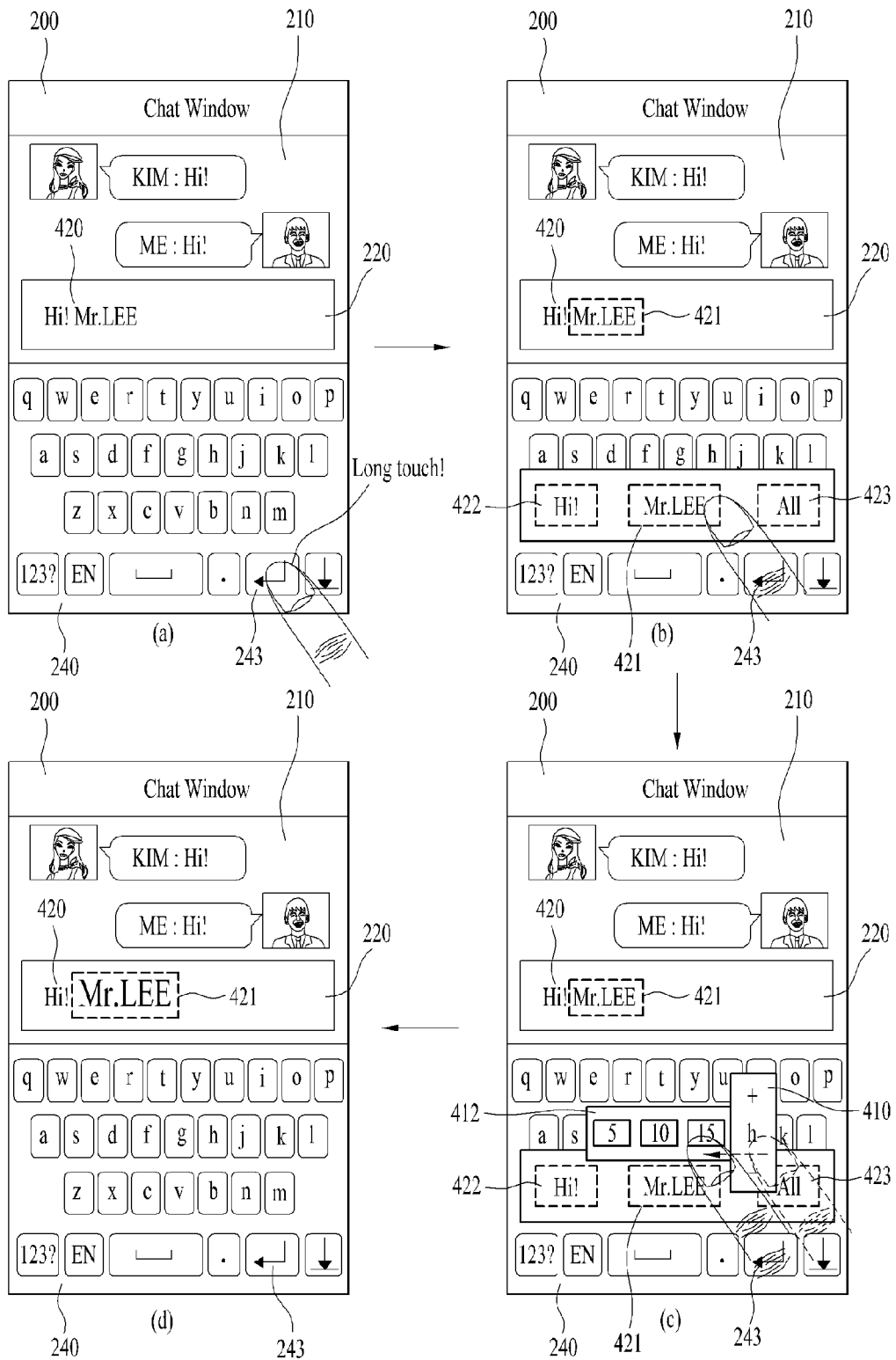

If a function key, to which a function of shifting a row of a cursor within a chat content input window 220 is assigned, in a keypad 240 is touched in a preset manner, FIG. 29 and FIG. 30 shows a process for providing an editing function of editing a chat content previously displayed on the chat content input window 220 instead of providing a unique function (e.g., row shift) of the function key.

For instance, FIG. 29(a) shows that a specific chat content 'Hi! Mr. LEE' 420 is already input to the chat content input window 220 by a user and that a function key, to which the row shift function of the cursor is assigned, is an enter key 243 within the keypad 240. In this instance, the preset touch manner may include a long touch to the enter key 243.

If the enter key 243 is long touched (FIG. 29(a)), the controller 180 displays an editing UI 410 configured to provide an editing function of editing the whole chat content 420 and then displays an editing result edited via the editing UI 410 by applying the editing result to the chat content 420 (FIG. 29(b) and FIG. 29(c)).

For example, the editing process using the editing UI 410 may be performed in the same manners described with reference to FIG. 23 and FIG. 24. In particular, if the enter key 243 is long touched, the controller 180 displays the editing UI 410, which provides the editing function of editing the chat content 420, around the enter key 243. If a specific font size 412A is set via the editing UI 410, the controller 180 can change the font size of the chat content 420 into the set font size 412A.

In addition, if the enter key 243 is long touched (FIG. 30(a)), the controller 180 displays a list containing the respective words 421, 422 and 423 within the chat content 420 (FIG. 30 (b)).

If a word 'Mr. LEE' 421 desired to be edited in the list is touched (e.g., long touched) in a preset manner, referring to FIG. 30(c), the controller 180 displays an editing UI 410 configured to provide an editing function of editing the word 'Mr. LEE' 421 around the word 'Mr. LEE' 421. If a specific font size is set via the editing UI 410, referring to FIG. 30(d), the controller 180 can change the font size of the word 'Mr. LEE' 421 into the set font size.

The controller 180 can provide the editing function of editing the word 'Mr. LEE' 421 in proportion to a long-touch maintained time of the word 'Mr. LEE' 421 in the same manner described with reference to FIG. 25, provide the editing function of editing the word 'Mr. LEE' 421 in proportion to a drag distance of the word 'Mr. LEE' 421 in the same manner described with reference to FIG. 26, and provide the editing function of editing the word 'Mr. LEE' 421 in response to a pinching extent of a pinching-in/out multi-touch input to the word 'Mr. LEE' 421 in the same manner described with reference to FIG. 27.

Figure 31:
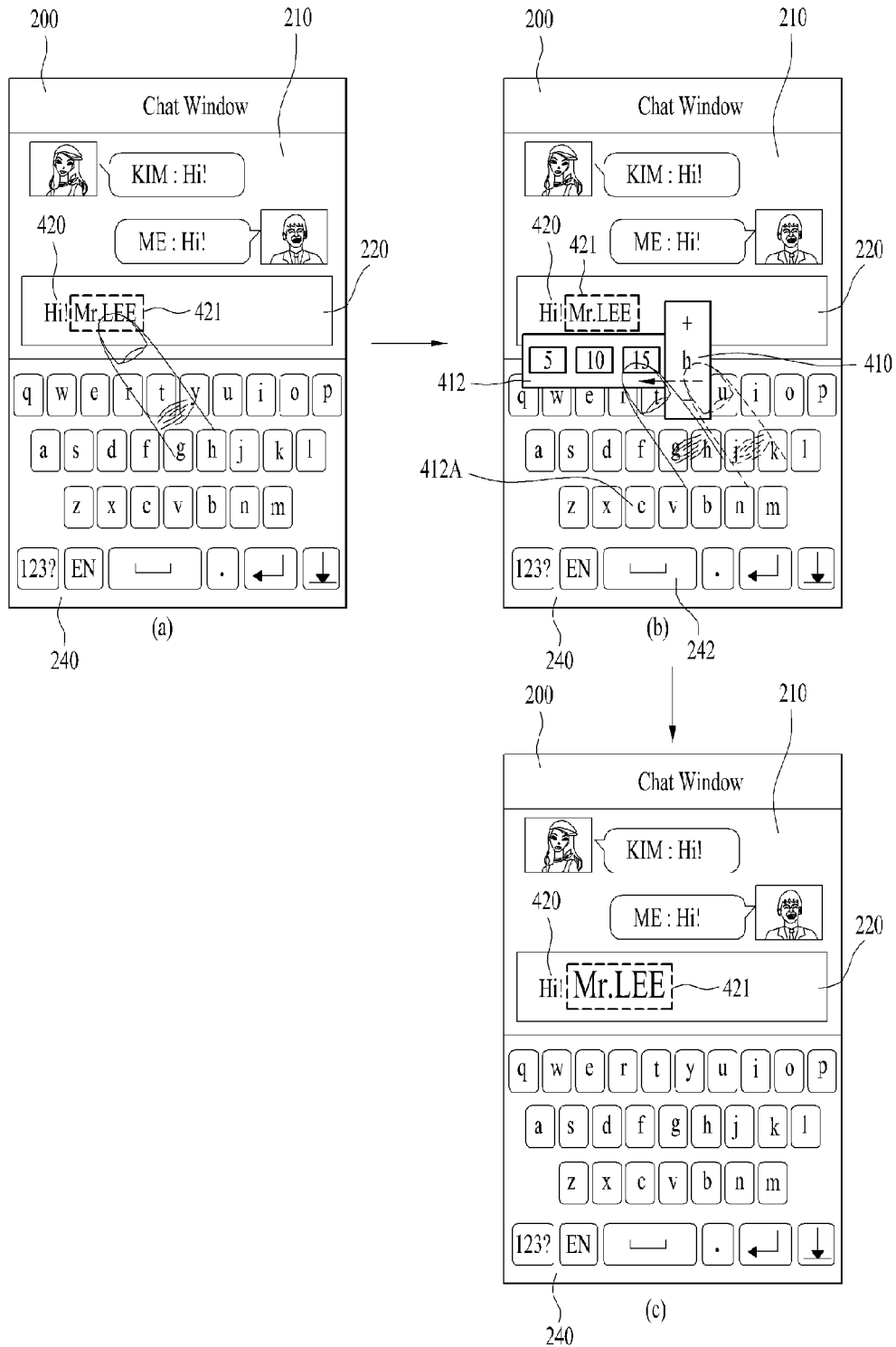

Next, if a portion of a chat content 420 input to a chat content window 220 is touched in a preset manner, FIG. 31 shows a process for providing an editing function of editing a portion of the touched chat content 420.

Referring to FIG. 31, while the chat content 420 is input to the chat content input window 220, if a portion 421 of the chat content 420 is touched in a preset manner (e.g., a long touch) (FIG. 31(*a*)), the controller 180 displays an editing UI 410 configured to provide an editing function of editing the portion 421 of the chat content 421 and then displays an editing result edited via the editing UI 410 by applying the editing result to the portion 421 of the chat content 420 (FIG. 31(*b*)).

In this instance, the portion 421 of the chat content 420 may include one of a specific character, word and sentence in the chat content 420. For example, the editing process using the editing UI 410 may be performed in the same manners described with reference to FIG. 23 and FIG. 24.

In particular, if the portion 421 of the chat content 420 is long touched, the controller 180 displays the editing UI 410, which provides the editing function of editing the word 'Mr. LEE' 421, around the portion 421 of the chat content 420. If a specific font size '15' is set via the editing UI 410, the controller 180 can change the font size of the portion 421 of the chat content 420 into the set font size '15'.

Further, the controller 180 can provide the editing function of editing the portion 421 of the chat content 420 in proportion to a long-touch maintained time of the portion 421 of the portion 421 of the chat content 420 in the same manner described with reference to FIG. 25, can provide the editing function of editing the portion 421 of the chat content 420 in proportion to a drag distance of the portion 421 of the chat content 420 in the same manner described with reference to FIG. 26, and can provide the editing function of editing the portion 421 of the chat content 420 in response to a pinching extent of a pinching-in/out multi-touch input to the portion 421 of the chat content 420 in the same manner described with reference to FIG. 27.

Figure 32:
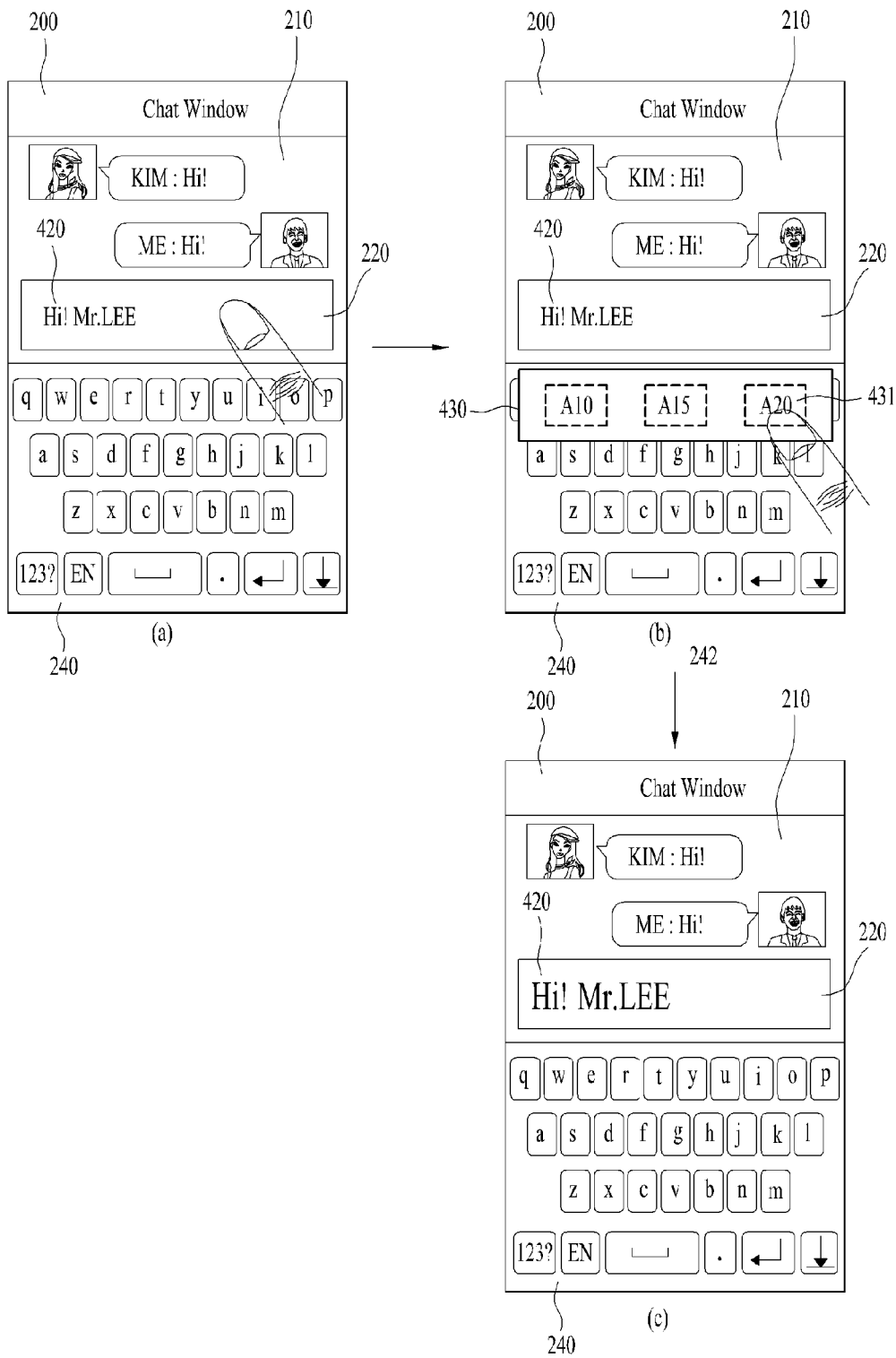

While a chat content 420 is input to a chat content input window 220, when a list of at least one editing scheme recently applied to a chat content is displayed, if a specific editing scheme is selected from the list, FIG. 32 shows a process for applying the selected editing scheme to the chat content 420 input to the chat content input window 220.

Referring to FIG. 32, if chat contents are edited through the editing process according to an embodiment of the present invention, the controller 180 checks the editing schemes applied to the chat contents and then saves the checked editing schemes in the memory 160.

Referring to FIG. 32(*a*) and FIG. 32(*b*), if the chat content 420 is input to the chat content input window 220, the controller 180 searches the memory 160 for the editing schemes recently applied to the chat contents and then displays a list 430 of the found editing schemes.

For example, the controller 180 assigns a paging function of paging the list 430 to a specific key in the keypad 240. If a user touches the specific key in a preset manner (e.g., a long touch), the controller 180 displays the list 430. For instance, in FIG. 32(*a*), if the chat content input window 220 is touched in a preset manner (e.g., a long touch), the controller 180 displays the list 430.

If a specific editing scheme 431 is selected from the list 430 (FIG. 32(*b*)), the controller 180 may apply the selected editing scheme 431 to the chat content 420 (FIG. 32(*c*)).

Next, if the same character is consecutively input as a chat content 420 to a chat content input window 220, FIG. 33 shows a process for providing an editing function of editing the consecutively input characters.

Referring to FIG. 33, if a specific text input key 'i' of the keypad 240 is consecutively touched two times at least or the specific text input key 'i' is input at least twice by being long touched for a preset duration (FIG. 33(*a*)), the controller 180 gradually increases each of the font sizes of the consecutively input characters 'i', thereby emphasizing the chat content 420 containing the consecutively input characters 'i' to at least one counterpart (FIG. 33(*b*)).

Besides, if a specific text input key 'i' of the keypad 240 is consecutively touched two times at least or the specific text input key 'i' is input at least twice by being long touched for a preset duration, the controller 180 displays the consecutively input characters 'i' in a manner that a font color of each of the consecutively input characters 'i' gets darker or brighter, thereby emphasizing the chat content 420 containing the consecutively input characters 'i' to at least one counterpart.

Accordingly, embodiments of the present invention provide several advantages.

First, embodiments of the present invention provide a user with an editing function of editing a chat content in addition to unique functions of keys for inputting and sending the chat content, thereby enabling the user to use additional chat content editing functions as well as the regular functions of the keys for inputting and sending the chat content.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
   a touchscreen configured to display a keypad including keys for inputting and sending a chat content to at least one chat counterpart and an input window for displaying the chat content input via the keys;
   a wireless communication unit configured to wirelessly communicate the chat content with the at least one chat counterpart; and
   a controller configured to:
   receive a touch action on a specific key of the keypad,
   determine if the touch action corresponds to a preset touch manner that is different than a single short touch action on the specific key,
   send or input the chat content if the touch action is the single short touch action on the specific key, and
   provide an editing function of the chat content rather than sending or inputting the chat content if the touch action corresponds to the preset touch manner that is different than the single short touch action,
   wherein the editing function comprises a list function including a list with at least one popular phrase, and the controller is further configured to display a popular phrase selected from the list on the input window,
  wherein the controller is further configured to continuously display the editing function as long as the preset touch manner is continuously maintained on the specific key,
  wherein the popular phrase is selected via an input different than the preset touch manner maintained on the specific key,
  wherein the controller is further configured to send the edited chat content to the at least one chat counterpart in response to the continuously maintained preset touch manner being released from the specific key, and
  wherein the specific key is a send key for sending the chat content to the at least one chat counterpart when the touch action is the single short touch action.

2. The mobile terminal of claim 1, wherein the preset touch manner comprises a long touch to the send key,
  wherein the controller is further configured to:
    automatically shift a highlight cursor in the list in response to a time taken to maintain the long touch to the send key, and
    wherein the edited chat content includes the popular phrase having the highlight cursor situated thereat.

3. The mobile terminal of claim 1, wherein the preset touch manner comprises a long touch to the send key,
  wherein the controller is further configured to:
    if the send key is dragged in specific direction, shift a highlight cursor in the list in response to a distance from a long touched point to a dragged point, and
    wherein the edited chat content includes the popular phrase having the highlight cursor situated thereat.

4. The mobile terminal of claim 1, wherein the controller is further configured to check whether a content of a reply to the chat content sent to the at least one chat counterpart is received from the at least one chat counterpart, and
  wherein if the reply content is not received, the controller is further configured to send a chat content urging the at least one chat counterpart to send the reply content.

5. The mobile terminal of claim 1, wherein if a specific counterpart is selected from the at least one chat counterpart, the controller is further configured to activate a secret chat mode of a chat with the specific counterpart and send the chat content input via the input window to the specific counterpart only.

6. The mobile terminal of claim 1, wherein the controller is further configured to switch a chat mode with the at least one chat counterpart to a call mode and connect a call with the at least one chat counterpart via the wireless communication unit.

7. A method of controlling a mobile terminal, the method comprising:
  displaying, via a touchscreen of the mobile terminal, a keypad including keys for inputting and sending a chat content to at least one chat counterpart and an input window for displaying the chat content input via the keys;
  wirelessly communicating, via a wireless communication unit of the mobile terminal, the chat content with the at least one chat counterpart;
  receiving, via a controller of the mobile terminal, a touch action on a specific key of the keypad;
  determining, via the controller, if the touch action corresponds to a preset touch manner that is different than a single short touch action on the specific key;
  sending or inputting, via the controller, the chat content if the touch action is the single short touch action on the specific key; and
  providing, via the controller, an editing function of the chat content rather than sending or inputting the chat content if the touch action corresponds to the preset touch manner that is different than the single short touch action,
  wherein the editing function comprises a list function including a list with at least one popular phrase, and the method further comprises displaying a popular phrase selected from the list on the input window,
  wherein the method further comprises continuously displaying the editing function as long as the preset touch manner is continuously maintained on the specific key,
  wherein the popular phrase is selected via an input different than the preset touch manner maintained on the specific key,
  wherein the method further comprises sending the edited chat content to the at least one chat counterpart in response to the continuously maintained preset touch manner being released from the specific key, and
  wherein the specific key is a send key for sending the chat content to the at least one chat counterpart when the touch action is the single short touch action.

* * * * *